US011426885B1

(12) United States Patent
Rembisz et al.

(10) Patent No.: US 11,426,885 B1
(45) Date of Patent: Aug. 30, 2022

(54) ROBOT DOCKING STATION IDENTIFICATION SURFACE

(71) Applicant: X Development LLC, Mountain View, CA (US)

(72) Inventors: Justine Rembisz, Mountain View, CA (US); James Lubin, Mountain View, CA (US); Vincent Nabat, Mountain View, CA (US); Elmar Mair, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 460 days.

(21) Appl. No.: 16/553,114

(22) Filed: Aug. 27, 2019

(51) Int. Cl.
| *G01C 21/00* | (2006.01) |
| *B25J 19/00* | (2006.01) |
| *B25J 5/00* | (2006.01) |
| *B25J 9/16* | (2006.01) |
| *B60L 58/12* | (2019.01) |
| *G05D 1/02* | (2020.01) |
| *G01C 21/20* | (2006.01) |
| *B60L 53/36* | (2019.01) |

(52) U.S. Cl.
CPC ............. *B25J 19/005* (2013.01); *B25J 5/00* (2013.01); *B25J 9/163* (2013.01); *B25J 9/1697* (2013.01); *B60L 53/36* (2019.02); *B60L 58/12* (2019.02); *G01C 21/206* (2013.01); *G05D 1/021* (2013.01)

(58) Field of Classification Search
CPC ....... B25J 9/163; B25J 9/1697; G05B 13/027; G06N 3/084; H04N 7/181
See application file for complete search history.

(56) References Cited

U.S. PATENT DOCUMENTS

| 2005/0156562 A1* | 7/2005 | Cohen ................... A47L 9/2805 |
| | | 320/107 |
| 2016/0309963 A1* | 10/2016 | Fritzinger ............... A47J 47/16 |
| 2017/0352351 A1* | 12/2017 | Kimura .................. B25J 13/089 |
| 2019/0143872 A1* | 5/2019 | Gil ............................ A47F 5/08 |
| | | 211/86.01 |
| 2019/0146517 A1* | 5/2019 | Ryu .......................... G06T 7/74 |
| | | 701/28 |
| 2019/0179333 A1* | 6/2019 | Noh ........................ G06N 20/00 |
| 2019/0202064 A1* | 7/2019 | Wolff ..................... A47L 9/2873 |
| 2019/0221000 A1* | 7/2019 | Li-Chee-Ming .......... G06T 7/75 |
| 2019/0324470 A1* | 10/2019 | Xiong .................... B25J 19/027 |
| 2019/0369625 A1* | 12/2019 | Chen ....................... B60L 53/67 |
| 2019/0372301 A1* | 12/2019 | Onishi ................ H01S 5/04254 |
| 2020/0241551 A1* | 7/2020 | Cairl ..................... G05D 1/0248 |
| 2021/0023715 A1* | 1/2021 | Zhang .................... B25J 9/1697 |
| 2021/0039573 A1* | 2/2021 | Gao ........................ B60R 19/42 |

* cited by examiner

*Primary Examiner* — Harry Y Oh
(74) *Attorney, Agent, or Firm* — McDonnell Boehnen Hulbert & Berghoff LLP

(57) ABSTRACT

A docking station is provided that includes at least one component configured to couple to a robot and an identification surface. The identification surface includes a first curvature that varies at a first substantially constant rate of change along a first dimension the identification includes a second curvature that varies at a second substantially constant rate of change along a second dimension. The second dimension is orthogonal to the first dimension. The identification surface includes a third curvature that varies at a third substantially constant rate of change along a third dimension. The third dimension is orthogonal to the first dimension and the second dimension.

23 Claims, 14 Drawing Sheets

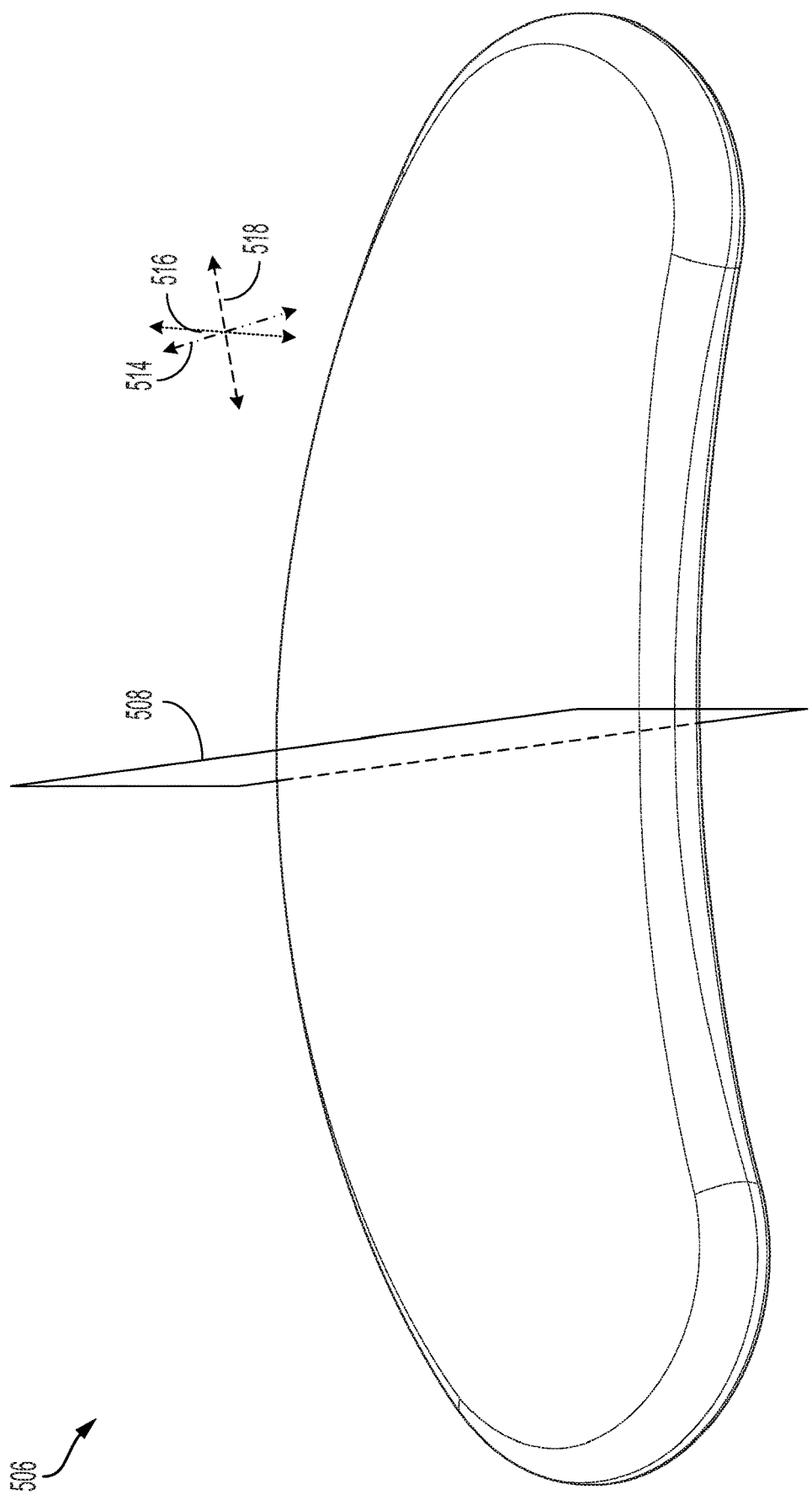

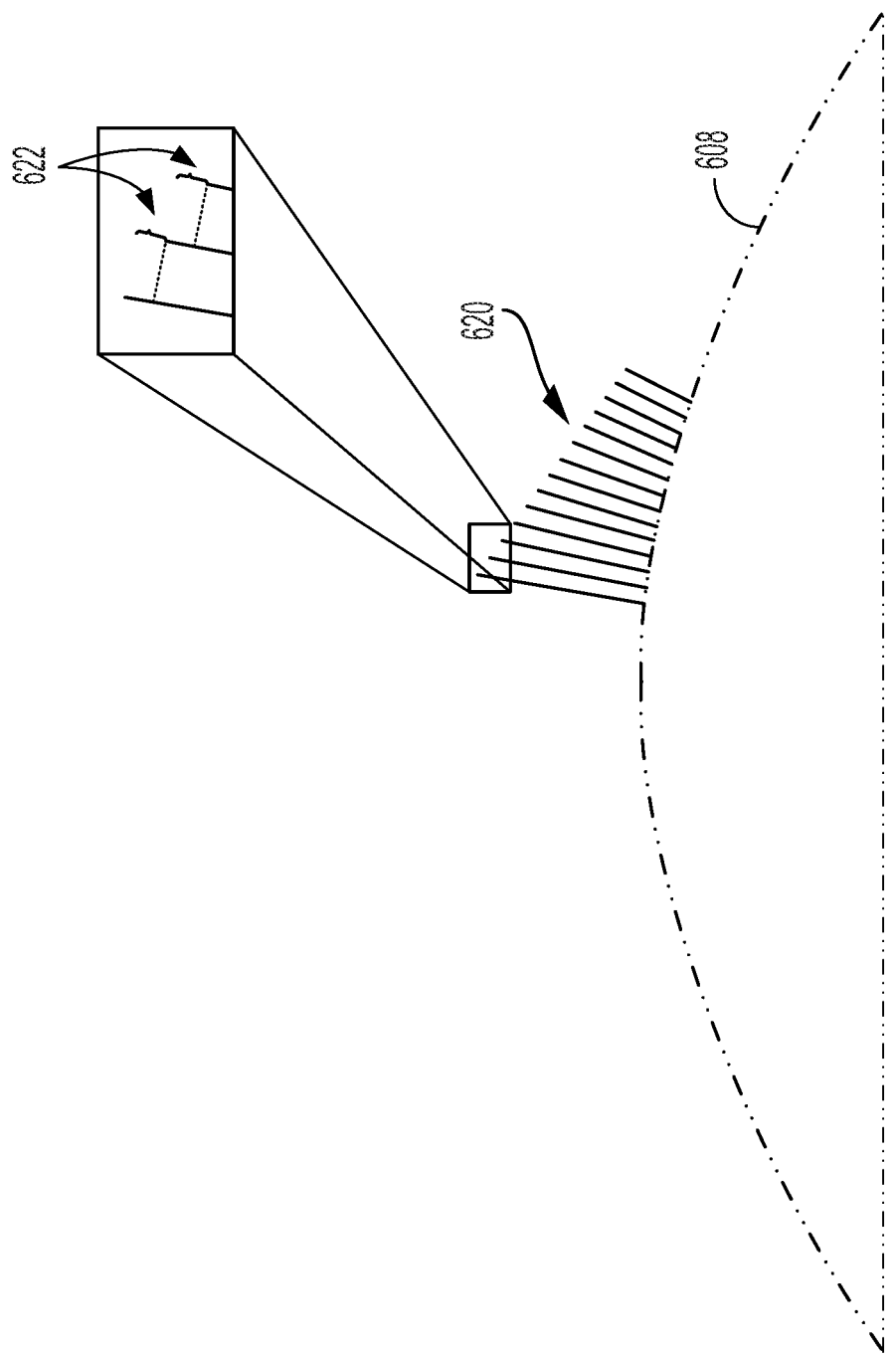

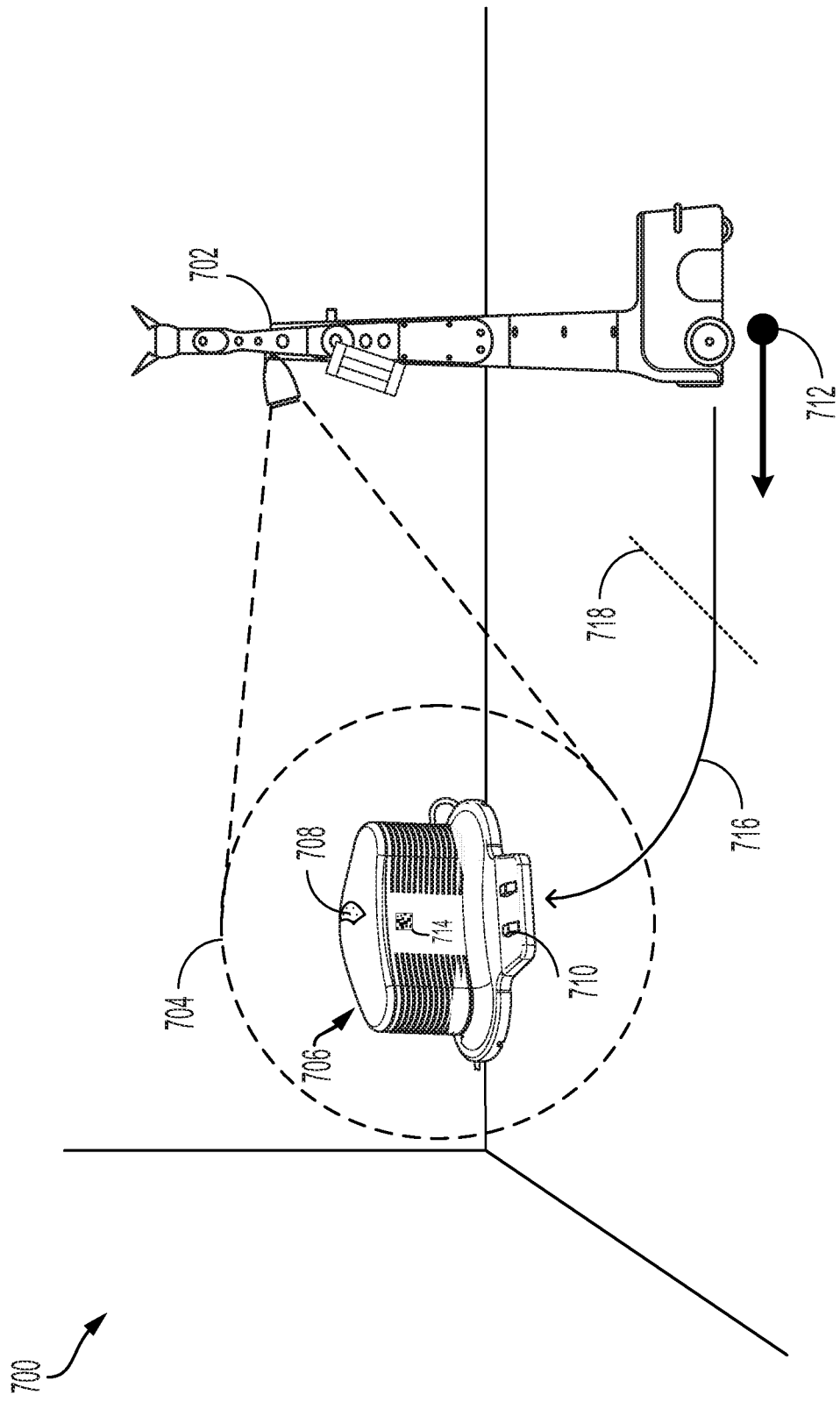

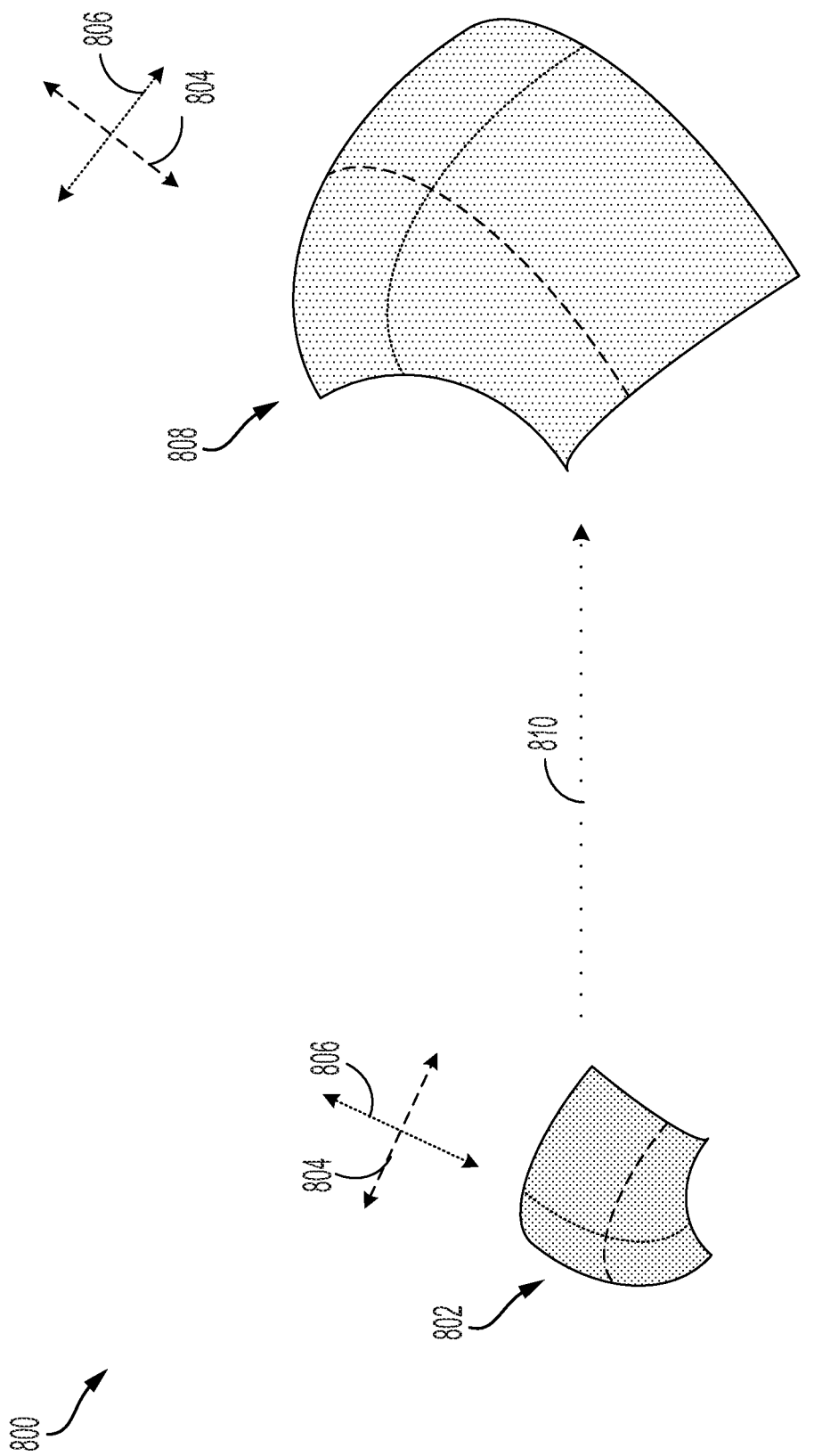

ROBOT DOCKING STATION IDENTIFICATION SURFACE

BACKGROUND

As technology advances, various types of robotic devices are being created for performing a variety of functions that may assist users. Robotic devices may be used for applications involving material handling, transportation, welding, assembly, and dispensing, among others. Over time, the manner in which these robotic systems operate is becoming more intelligent, efficient, and intuitive. As robotic systems become increasingly prevalent in numerous aspects of modern life, it is desirable for robotic systems to be efficient. Therefore, a demand for efficient robotic systems has helped open up a field of innovation in actuators, movement, sensing techniques, as well as component design and assembly.

SUMMARY

An example docking station for robotic devices includes an identification surface that is detectable by a robot. The identification surface includes at least one curvature that varies at a substantially constant rate of change. Detecting this curvature and associated rate of change in curvature allows the robot to directly or indirectly detect the docking station, and responsively navigate towards the docking station.

In an embodiment, docking station is provided. The docking station includes at least one component configured to couple to a robot. The docking station includes an identification surface. The identification surface includes a first curvature that varies at a first substantially constant rate of change along a first dimension. The identification surface includes a second curvature that varies at a second substantially constant rate of change along a second dimension. The second dimension is orthogonal to the first dimension. The identification surface includes a third curvature that varies at a third substantially constant rate of change along a third dimension. The third dimension is orthogonal to the first dimension and the second dimension.

In another embodiment, a method is provided. The method includes receiving, from one or more sensors of a robot, sensor data indicative of an environment of the robot. The method includes determining, based on the sensor data, a depth map representative of the environment. The method includes identifying, using the depth map, a surface within the environment. The method includes comparing the surface to a representation of a known identification surface of a docking station for the robot. The representation of the known identification surface includes a first curvature that varies at a first substantially constant rate of change along a first dimension. The representation of the known identification surface includes a second curvature that varies at a second substantially constant rate of change along a second dimension. The second dimension is orthogonal to the first dimension. The representation of the known identification surface includes a third curvature that varies at a third substantially constant rate of change along a third dimension. The third dimension is orthogonal to the first dimension and the second dimension. The method includes determining that the surface matches the representation of the known identification surface. The method includes identifying the surface as corresponding to the docking station based on the surface matching the representation of the known identification surface.

In an additional embodiment, a system is provided. The system includes a docking station. The docking station includes a housing, a coupling component, and an identification surface disposed on the housing. The identification surface includes a first curvature that varies at a first substantially constant rate of change along a first dimension. The identification surface includes a second curvature that varies at a second substantially constant rate of change along a second dimension. The second dimension is orthogonal to the first dimension. The identification surface includes a third curvature that varies at a third substantially constant rate of change along a third dimension. The third dimension is orthogonal to the first dimension and the second dimension. The system further includes a robot configured to perform a set of functions. The set of functions includes detecting the identification surface, navigating toward the docking station based on detecting the identification surface, and coupling to the coupling component of the docking station.

In a further embodiment, a non-transitory computer readable medium is provided which includes programming instructions executable by at least one processor to cause the at least one processor to perform functions. The functions include receiving, from one or more sensors of a robot, sensor data indicative of an environment of the robot. The functions include determining, based on the sensor data, a depth map representative of the environment. The functions include identifying, using the depth map, a surface within the environment. The functions include comparing the surface to a representation of a known identification surface of a docking station for the robot. The representation of the known identification surface includes a first curvature that varies at a first substantially constant rate of change along a first dimension. The representation of the known identification surface includes a second curvature that varies at a second substantially constant rate of change along a second dimension. The second dimension is orthogonal to the first dimension. The representation of the known identification surface includes a third curvature that varies at a third substantially constant rate of change along a third dimension. The third dimension is orthogonal to the first dimension and the second dimension. The functions include determining that the surface matches the representation of the known identification surface. The functions include identifying the surface as corresponding to the docking station based on the surface matching the representation of the known identification surface.

In another embodiment, a system is provided that includes means for performing functions. The system includes means for receiving, from one or more sensors of a robot, sensor data indicative of an environment of the robot. The system includes means for determining, based on the sensor data, a depth map representative of the environment. The system includes means for identifying, using the depth map, a surface within the environment. The system includes means for comparing the surface to a representation of a known identification surface of a docking station for the robot. The representation of the known identification surface includes a first curvature that varies at a first substantially constant rate of change along a first dimension. The representation of the known identification surface includes a second curvature that varies at a second substantially constant rate of change along a second dimension. The second dimension is orthogonal to the first dimension. The representation of the known identification surface includes a third curvature that varies at a third substantially constant rate of change along a third dimension. The third dimension is orthogonal to the first dimension and the second dimension. The system includes means for determining that the surface matches the representation of the known identification surface. The system includes means for identifying the surface as corresponding to the docking station based on the surface matching the representation of the known identification surface.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE DRAWINGS

FIGS. 5A and 5B illustrate a docking station with an identification surface, in accordance with example embodiments.

FIGS. 6A, 6B, 6C, 6D, and 6E illustrate an identification surface, in accordance with example embodiments.

FIG. 7 illustrates system including a robot and a docking station, in accordance with example embodiments.

FIG. 8 illustrates a portion of an identification surface and a corresponding portion of a representation of a known identification surface, in accordance with example embodiments.

DETAILED DESCRIPTION

Figure 1:
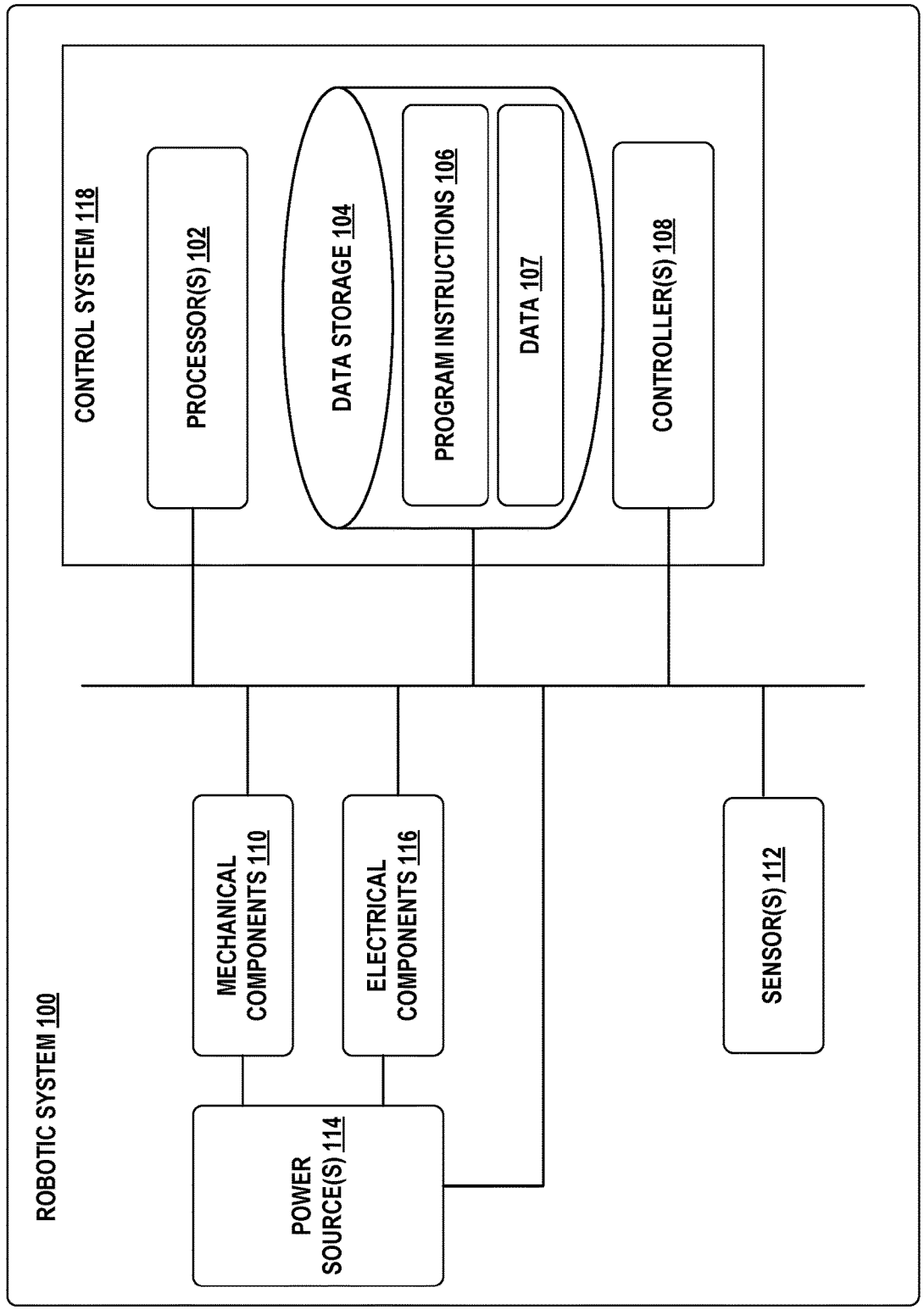
FIG. 1 illustrates a configuration of a robotic system, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless indicated as such. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Throughout this description, the articles "a" or "an" are used to introduce elements of the example embodiments. Any reference to "a" or "an" refers to "at least one," and any reference to "the" refers to "the at least one," unless otherwise specified, or unless the context clearly dictates otherwise. The intent of using the conjunction "or" within a described list of at least two terms is to indicate any of the listed terms or any combination of the listed terms.

The use of ordinal numbers such as "first," "second," "third" and so on is to distinguish respective elements rather than to denote a particular order of those elements. For purpose of this description, the terms "multiple" and "a plurality of" refer to "two or more" or "more than one."

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment. In the figures, similar symbols typically identify similar components, unless context dictates otherwise. Further, unless otherwise noted, figures are not drawn to scale and are used for illustrative purposes only. Moreover, the figures are representational only and not all components are shown. For example, additional structural or restraining components might not be shown.

Further, as used herein, the term "substantially" refers to characteristics, parameters, and/or values that need not be achieved exactly, but that deviations or variations thereof, including for example, tolerances, measurement error, measurement accuracy limitations and other factors known to skill in the art, may occur in amounts that do not preclude the effect the characteristics, parameters, and/or values were intended to provide. For example, a curvature varying at a "substantially constant" rate may refer to the curvature varying at a rate that falls within a tolerance level (e.g., a standard deviation from an average rate).

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Overview

A mobile robotic device (otherwise referred to herein as a "robot") may use a variety of sensors to collect information about an environment to assist the robot in operating in the environment and in performing tasks. A docking station may facilitate these tasks (e.g., by charging a battery of the robot. Thus, the docking station being readily detectable eases and facilitates operations performed by robots. By designing the docking station to have an identification surface having a curvature that varies at a substantially constant rate of change (otherwise referred to herein as a "continuous curvature"), each portion of the surface can have a unique curvature. In turn, designing the identification surface such that the curvature varies at a substantially constant rate of change along multiple dimensions allows robots to detect the docking station from multiple angles, and also to determine poses of the robot relative to the docking station. Allowing for effective detection of, and navigation towards, docking stations may allow for more efficient operations in a robotic environment.

In some examples, a robot may be equipped with a three-dimensional (3D) lidar sensor, 3D image capture devices, or other sensors and/or devices used to derive a depth map of an environment. For example, the depth map can be based on 3D point cloud data from a lidar sensor or from overlapping fields of view of a stereo camera. A depth map of the environment can be used, not only for rendering a representation of the environment, but also for detecting particular objects, such as a docking station. In an example scenario, the robot initially scans the environment for a docking station in order to recharge. For example, this can be performed in accordance with existing data pertaining to the environment, such as mapped locations of docking stations, sensor data from past scans, or the like. This information can limit the scan to a region of interest and thereby bootstrap detection of a docking station. Having scanned the environment (e.g., the region of interest in the environment), the robot detects a plurality of different surfaces using a depth map resulting from the scan. The robot then samples portions of those surfaces and determines curvatures thereof. Because many surfaces do not have appreciable curvatures, and still others lack curvatures that vary at a rate of change (e.g., a sphere has a constant curvature), many surfaces can be eliminated as candidates with relative ease. A robot can determine that a sampled portion of one of the surfaces has a curvature that varies at a substantially constant rate of change, calculate the rate of change, and match it with an expected rate of change. In other examples, the robot may compare the portion of each surface to a stored representation of an identification surface, and match one of the portions of one of the surfaces, thus identifying the docking station.

In some examples, the identification surface of the docking station has a continuous curvature in three separate orthogonal dimensions, which allows the identification surface to be identified from various poses of a robot relative to the docking station. Because the curvature of the identification surface is continuous in all three spatial dimensions, any given surface line drawn along a curvature of the identification surface also has a continuous curvature, and any detected portion of the identification surface has a unique combination of curvatures along multiple dimensions on the surface.

In some examples, the docking station further includes a visual identifier that allows a robot to confirm detection of the docking station using the identification surface. For example, the robot may detect and navigate toward the docking station at a first distance from the docking station and detect the visual indicator upon reaching a second, shorter distance from the docking station.

In some examples, the robot may derive an initial estimate of a location of the docking station before scanning for the docking station. For example, a machine learning model can be trained using sensor data from multiple scans of the environment wherein a docking station was ultimately detected (correctly or incorrectly), and from scans wherein the docking station was not detected (correctly or incorrectly). Using sensor data from the robot, the machine learning model may provide an indication of a location of the docking station, and thus subsequent processing may be reduced by focusing a scan for the docking station to a particular portion of the environment, or using only a portion of a resulting depth map for detecting the docking station. In other examples, the robot may have access to a map having thereon representations of locations of docking stations, and the initial estimate may be determined based on the map.

II. Example Robotic Systems

FIG. 1 illustrates an example configuration of a robotic system that may be used in connection with the implementations described herein. Robotic system 100 may be configured to operate autonomously, semi-autonomously, or using directions provided by user(s). Robotic system 100 may be implemented in various forms, such as a robotic arm, industrial robot, or some other arrangement. Some example implementations involve a robotic system 100 engineered to be low cost at scale and designed to support a variety of tasks. Robotic system 100 may be designed to be capable of operating around people. Robotic system 100 may also be optimized for machine learning. Throughout this description, robotic system 100 may also be referred to as a robot, robotic device, or mobile robot, among other designations.

As shown in FIG. 1, robotic system 100 may include processor(s) 102, data storage 104, and controller(s) 108, which together may be part of control system 118. Robotic system 100 may also include sensor(s) 112, power source(s) 114, mechanical components 110, and electrical components 116. Nonetheless, robotic system 100 is shown for illustrative purposes, and may include more or fewer components. The various components of robotic system 100 may be connected in any manner, including wired or wireless connections. Further, in some examples, components of robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). Processor(s) 102 may be configured to execute computer-readable program instructions 106, and manipulate data 107, both of which are stored in data storage 104. Processor(s) 102 may also directly or indirectly interact with other components of robotic system 100, such as sensor(s) 112, power source(s) 114, mechanical components 110, or electrical components 116.

Data storage 104 may be one or more types of hardware memory. For example, data storage 104 may include or take the form of one or more computer-readable storage media that can be read or accessed by processor(s) 102. The one or more computer-readable storage media can include volatile or non-volatile storage components, such as optical, magnetic, organic, or another type of memory or storage, which can be integrated in whole or in part with processor(s) 102. In some implementations, data storage 104 can be a single physical device. In other implementations, data storage 104 can be implemented using two or more physical devices, which may communicate with one another via wired or wireless communication. As noted previously, data storage 104 may include the computer-readable program instructions 106 and data 107. Data 107 may be any type of data, such as configuration data, sensor data, or diagnostic data, among other possibilities.

Controller 108 may include one or more electrical circuits, units of digital logic, computer chips, or microprocessors that are configured to (perhaps among other tasks), interface between any combination of mechanical components 110, sensor(s) 112, power source(s) 114, electrical components 116, control system 118, or a user of robotic system 100. In some implementations, controller 108 may be a purpose-built embedded device for performing specific operations with one or more subsystems of the robotic system 100.

Control system 118 may monitor and physically change the operating conditions of robotic system 100. In doing so, control system 118 may serve as a link between portions of robotic system 100, such as between mechanical components 110 or electrical components 116. In some instances, control system 118 may serve as an interface between robotic system 100 and another computing device. Further, control system 118 may serve as an interface between robotic system 100 and a user. In some instances, control system 118 may include various components for communicating with robotic system 100, including a joystick, buttons, or ports, etc. The example interfaces and communications noted above may be implemented via a wired or wireless connection, or both. Control system 118 may perform other operations for robotic system 100 as well.

During operation, control system 118 may communicate with other systems of robotic system 100 via wired or wireless connections, and may further be configured to communicate with one or more users of the robot. As one possible illustration, control system 118 may receive an input (e.g., from a user or from another robot) indicating an instruction to perform a requested task, such as to pick up and move an object from one location to another location. Based on this input, control system 118 may perform operations to cause the robotic system 100 to make a sequence of movements to perform the requested task. As another illustration, a control system may receive an input indicating an instruction to move to a requested location. In response, control system 118 (perhaps with the assistance of other components or systems) may determine a direction and speed to move robotic system 100 through an environment en route to the requested location.

Operations of control system 118 may be carried out by processor(s) 102. Alternatively, these operations may be carried out by controller(s) 108, or a combination of processor(s) 102 and controller(s) 108. In some implementations, control system 118 may partially or wholly reside on a device other than robotic system 100, and therefore may at least in part control robotic system 100 remotely.

Mechanical components 110 represent hardware of robotic system 100 that may enable robotic system 100 to perform physical operations. As a few examples, robotic system 100 may include one or more physical members, such as an arm, an end effector, a head, a neck, a torso, a base, and wheels. The physical members or other parts of robotic system 100 may further include actuators arranged to move the physical members in relation to one another. Robotic system 100 may also include one or more structured bodies for housing control system 118 or other components, and may further include other types of mechanical components. The particular mechanical components 110 used in a given robot may vary based on the design of the robot, and may also be based on the operations or tasks the robot may be configured to perform.

In some examples, mechanical components 110 may include one or more removable components. Robotic system 100 may be configured to add or remove such removable components, which may involve assistance from a user or another robot. For example, robotic system 100 may be configured with removable end effectors or digits that can be replaced or changed as needed or desired. In some implementations, robotic system 100 may include one or more removable or replaceable battery units, control systems, power systems, bumpers, or sensors. Other types of removable components may be included within some implementations.

Robotic system 100 may include sensor(s) 112 arranged to sense aspects of robotic system 100. Sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, or cameras, among other possibilities. Within some examples, robotic system 100 may be configured to receive sensor data from sensors that are physically separated from the robot (e.g., sensors that are positioned on other robots or located within the environment in which the robot is operating).

Sensor(s) 112 may provide sensor data to processor(s) 102 (perhaps by way of data 107) to allow for interaction of robotic system 100 with its environment, as well as monitoring of the operation of robotic system 100. The sensor data may be used in evaluation of various factors for activation, movement, and deactivation of mechanical components 110 and electrical components 116 by control system 118. For example, sensor(s) 112 may capture data corresponding to the terrain of the environment or location of nearby objects, which may assist with environment recognition and navigation.

In some examples, sensor(s) 112 may include RADAR (e.g., for long-range object detection, distance determination, or speed determination), LIDAR (e.g., for short-range object detection, distance determination, or speed determination), SONAR (e.g., for underwater object detection, distance determination, or speed determination), VICON® (e.g., for motion capture), one or more cameras (e.g., stereoscopic cameras for 3D vision), a global positioning system (GPS) transceiver, or other sensors for capturing information of the environment in which robotic system 100 is operating. Sensor(s) 112 may monitor the environment in real time, and detect obstacles, elements of the terrain, weather conditions, temperature, or other aspects of the environment. In another example, sensor(s) 112 may capture data corresponding to one or more characteristics of a target or identified object, such as a size, shape, profile, structure, or orientation of the object.

Further, robotic system 100 may include sensor(s) 112 configured to receive information indicative of the state of robotic system 100, including sensor(s) 112 that may monitor the state of the various components of robotic system 100. Sensor(s) 112 may measure activity of systems of robotic system 100 and receive information based on the operation of the various features of robotic system 100, such as the operation of an extendable arm, an end effector, or other mechanical or electrical features of robotic system 100. The data provided by sensor(s) 112 may enable control system 118 to determine errors in operation as well as monitor overall operation of components of robotic system 100.

As an example, robotic system 100 may use force/torque sensors to measure load on various components of robotic system 100. In some implementations, robotic system 100 may include one or more force/torque sensors on an arm or end effector to measure the load on the actuators that move one or more members of the arm or end effector. In some examples, the robotic system 100 may include a force/torque sensor at or near the wrist or end effector, but not at or near other joints of a robotic arm. In further examples, robotic system 100 may use one or more position sensors to sense the position of the actuators of the robotic system. For instance, such position sensors may sense states of extension, retraction, positioning, or rotation of the actuators on an arm or end effector.

As another example, sensor(s) 112 may include one or more velocity or acceleration sensors. For instance, sensor(s) 112 may include an inertial measurement unit (IMU). The IMU may sense velocity and acceleration in the world frame, with respect to the gravity vector. The velocity and acceleration sensed by the IMU may then be translated to that of robotic system 100 based on the location of the IMU in robotic system 100 and the kinematics of robotic system 100.

Robotic system 100 may include other types of sensors not explicitly discussed herein. Additionally or alternatively, the robotic system may use particular sensors for purposes not enumerated herein.

Robotic system 100 may also include one or more power source(s) 114 configured to supply power to various components of robotic system 100. Among other possible power systems, robotic system 100 may include a hydraulic system, electrical system, batteries, or other types of power systems. As an example illustration, robotic system 100 may include one or more batteries configured to provide charge to components of robotic system 100. Some of mechanical components 110 or electrical components 116 may each connect to a different power source, may be powered by the same power source, or be powered by multiple power sources.

Any type of power source may be used to power robotic system 100, such as electrical power or a gasoline engine. Additionally or alternatively, robotic system 100 may include a hydraulic system configured to provide power to mechanical components 110 using fluid power. Components of robotic system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of robotic system 100. Power source(s) 114 may charge using various types of charging, such as wired connections to an outside power source, wireless charging, combustion, or other examples.

Electrical components 116 may include various mechanisms capable of processing, transferring, or providing electrical charge or electric signals. Among possible examples, electrical components 116 may include electrical wires, circuitry, or wireless communication transmitters and receivers to enable operations of robotic system 100. Electrical components 116 may interwork with mechanical components 110 to enable robotic system 100 to perform various operations. Electrical components 116 may be configured to provide power from power source(s) 114 to the various mechanical components 110, for example. Further, robotic system 100 may include electric motors. Other examples of electrical components 116 may exist as well.

Robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to operate in tight spaces may have a relatively tall, narrow body. Further, the body or the other components may be developed using various types of materials, such as metals or plastics. Within other examples, a robot may have a body with a different structure or made of various types of materials.

The body or the other components may include or carry sensor(s) 112. These sensors may be positioned in various locations on the robotic system 100, such as on a body, a head, a neck, a base, a torso, an arm, or an end effector, among other examples.

Robotic system 100 may be configured to carry a load, such as a type of cargo that is to be transported. In some examples, the load may be placed by the robotic system 100 into a bin or other container attached to the robotic system 100. The load may also represent external batteries or other types of power sources (e.g., solar panels) that the robotic system 100 may utilize. Carrying the load represents one example use for which the robotic system 100 may be configured, but the robotic system 100 may be configured to perform other operations as well.

As noted above, robotic system 100 may include various types of appendages, wheels, end effectors, gripping devices and so on. In some examples, robotic system 100 may include a mobile base with wheels, treads, or some other form of locomotion. Additionally, robotic system 100 may include a robotic arm or some other form of robotic manipulator. In the case of a mobile base, the base may be considered as one of mechanical components 110 and may include wheels, powered by one or more of actuators, which allow for mobility of a robotic arm in addition to the rest of the body.

Figure 2:
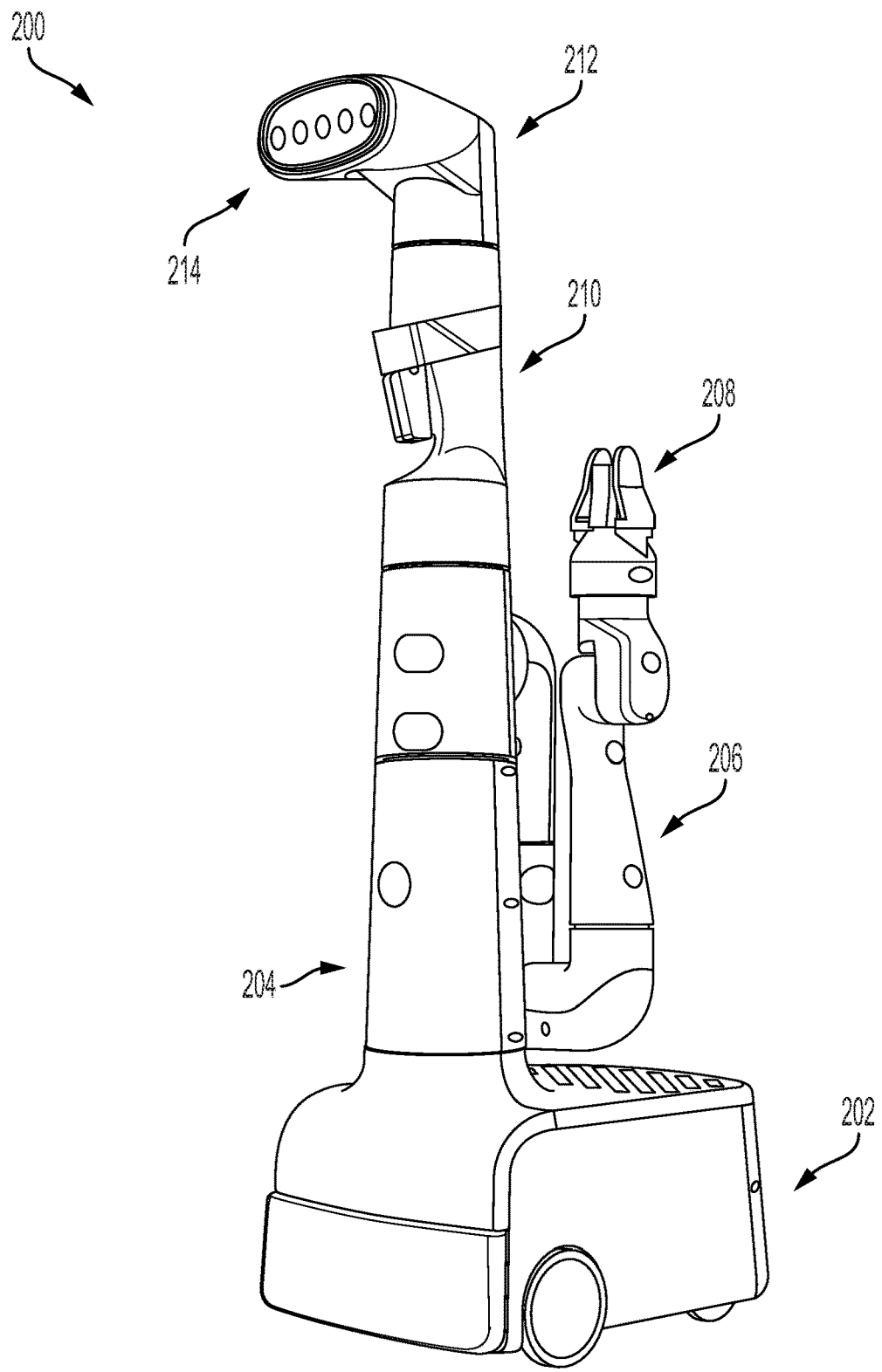
FIG. 2 illustrates a mobile robot, in accordance with example embodiments.
Figure 3:
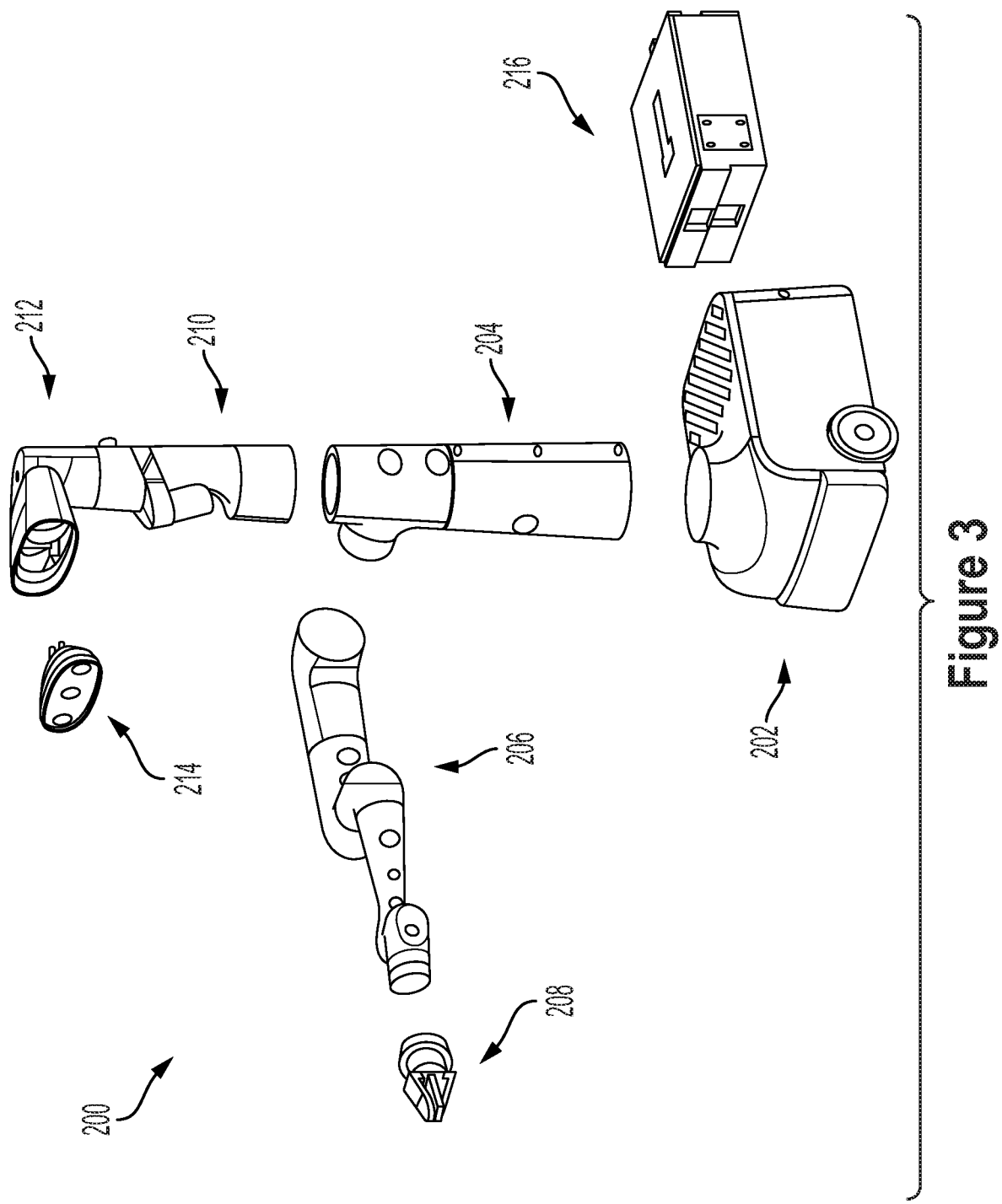
FIG. 3 illustrates an exploded view of a mobile robot, in accordance with example embodiments.

FIG. 2 illustrates a mobile robot, in accordance with example embodiments. FIG. 3 illustrates an exploded view of the mobile robot, in accordance with example embodiments. More specifically, a robot 200 may include a mobile base 202, a midsection 204, an arm 206, an end-of-arm system (EOAS) 208, a mast 210, a perception housing 212, and a perception suite 214. The robot 200 may also include a compute box 216 stored within mobile base 202.

The mobile base 202 includes two drive wheels positioned at a front end of the robot 200 in order to provide locomotion to robot 200. The mobile base 202 also includes additional casters (not shown) to facilitate motion of the mobile base 202 over a ground surface. The mobile base 202 may have a modular architecture that allows compute box 216 to be easily removed. Compute box 216 may serve as a removable control system for robot 200 (rather than a mechanically integrated control system). After removing external shells, the compute box 216 can be easily removed and/or replaced. The mobile base 202 may also be designed to allow for additional modularity. For example, the mobile base 202 may also be designed so that a power system, a battery, and/or external bumpers can all be easily removed and/or replaced.

The midsection 204 may be attached to the mobile base 202 at a front end of the mobile base 202. The midsection 204 includes a mounting column which is fixed to the mobile base 202. The midsection 204 additionally includes a rotational joint for arm 206. More specifically, the midsection 204 includes the first two degrees of freedom for arm 206 (a shoulder yaw J0 joint and a shoulder pitch J1 joint). The mounting column and the shoulder yaw J0 joint may form a portion of a stacked tower at the front of mobile base 202. The mounting column and the shoulder yaw J0 joint may be coaxial. The length of the mounting column of midsection 204 may be chosen to provide the arm 206 with sufficient height to perform manipulation tasks at commonly encountered height levels (e.g., coffee table top and counter top levels). The length of the mounting column of midsection 204 may also allow the shoulder pitch J1 joint to rotate the arm 206 over the mobile base 202 without contacting the mobile base 202.

The arm 206 may be a 7DOF robotic arm when connected to the midsection 204. As noted, the first two DOFs of the arm 206 may be included in the midsection 204. The remaining five DOFs may be included in a standalone section of the arm 206 as illustrated in FIGS. 2 and 3. The arm 206 may be made up of plastic monolithic link structures. Inside the arm 206 may be housed standalone actuator modules, local motor drivers, and thru bore cabling.

The EOAS 208 may be an end effector at the end of arm 206. EOAS 208 may allow the robot 200 to manipulate objects in the environment. As shown in FIGS. 2 and 3, EOAS 208 may be a gripper, such as an underactuated pinch gripper. The gripper may include one or more contact sensors such as force/torque sensors and/or non-contact sensors such as one or more cameras to facilitate object detection and gripper control. EOAS 208 may also be a different type of gripper such as a suction gripper or a different type of tool such as a drill or a brush. EOAS 208 may also be swappable or include swappable components such as gripper digits.

The mast 210 may be a relatively long, narrow component between the shoulder yaw J0 joint for arm 206 and perception housing 212. The mast 210 may be part of the stacked tower at the front of mobile base 202. The mast 210 may be fixed relative to the mobile base 202. The mast 210 may be coaxial with the midsection 204. The length of the mast 210 may facilitate perception by perception suite 214 of objects being manipulated by EOAS 208. The mast 210 may have a length such that when the shoulder pitch J1 joint is rotated vertical up, a topmost point of a bicep of the arm 206 is approximately aligned with a top of the mast 210. The length of the mast 210 may then be sufficient to prevent a collision between the perception housing 212 and the arm 206 when the shoulder pitch J1 joint is rotated vertical up.

As shown in FIGS. 2 and 3, the mast 210 may include a 3D lidar sensor configured to collect depth information about the environment. The 3D lidar sensor may be coupled to a carved-out portion of the mast 210 and fixed at a downward angle. The lidar position may be optimized for localization, navigation, and for front cliff detection.

The perception housing 212 may include at least one sensor making up perception suite 214. The perception housing 212 may be connected to a pan/tilt control to allow for reorienting of the perception housing 212 (e.g., to view objects being manipulated by EOAS 208). The perception housing 212 may be a part of the stacked tower fixed to the mobile base 202. A rear portion of the perception housing 212 may be coaxial with the mast 210.

The perception suite 214 may include a suite of sensors configured to collect sensor data representative of the environment of the robot 200. The perception suite 214 may include an infrared (IR)-assisted stereo depth sensor. The perception suite 214 may additionally include a wide-angled red-green-blue (RGB) camera for human-robot interaction and context information. The perception suite 214 may additionally include a high resolution RGB camera for object classification. A face light ring surrounding the perception housing 212 may also be included for improved human-robot interaction and scene illumination.

Figure 4:
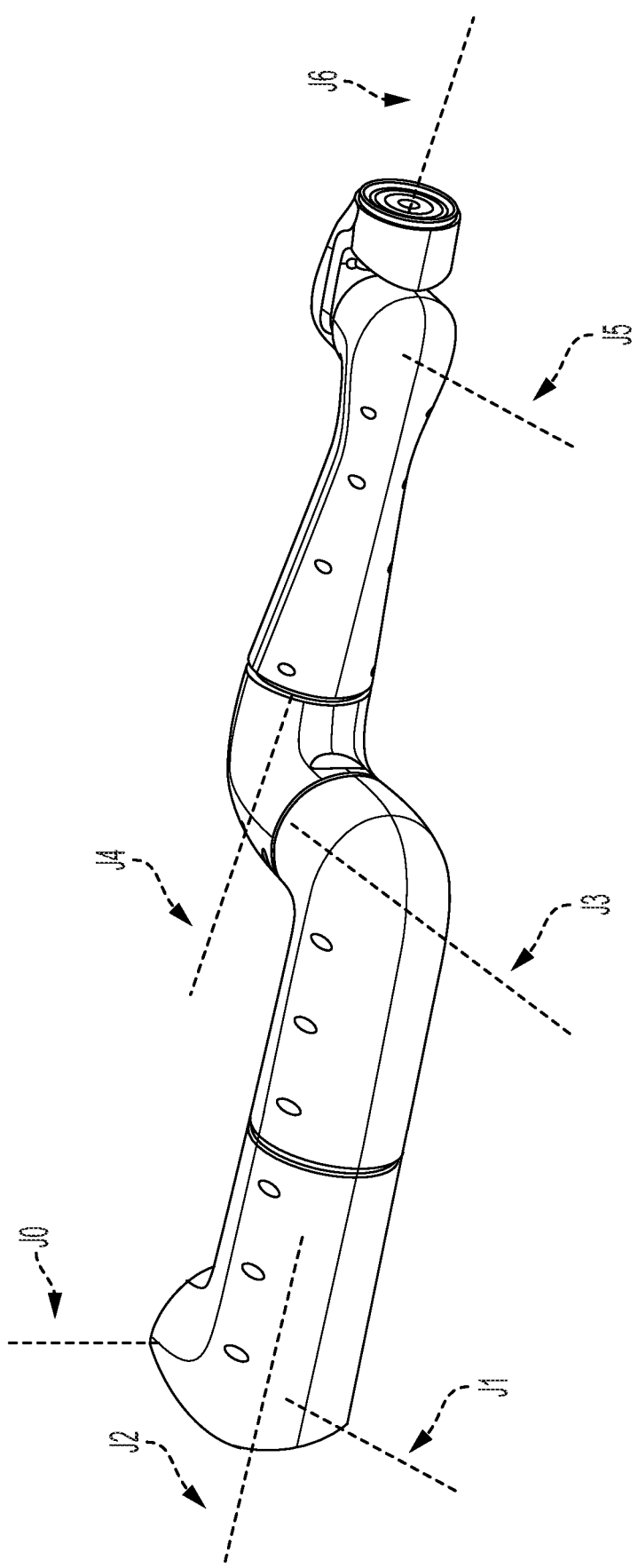
FIG. 4 illustrates a robotic arm, in accordance with example embodiments.

FIG. 4 illustrates a robotic arm, in accordance with example embodiments. The robotic arm includes 7 DOFs: a shoulder yaw J0 joint, a shoulder pitch J1 joint, a bicep roll J2 joint, an elbow pitch J3 joint, a forearm roll J4 joint, a wrist pitch J5 joint, and wrist roll J6 joint. Each of the joints may be coupled to one or more actuators. The actuators coupled to the joints may be operable to cause movement of links down the kinematic chain (as well as any end effector attached to the robot arm).

The shoulder yaw J0 joint allows the robot arm to rotate toward the front and toward the back of the robot. One beneficial use of this motion is to allow the robot to pick up an object in front of the robot and quickly place the object on the rear section of the robot (as well as the reverse motion). Another beneficial use of this motion is to quickly move the robot arm from a stowed configuration behind the robot to an active position in front of the robot (as well as the reverse motion).

The shoulder pitch J1 joint allows the robot to lift the robot arm (e.g., so that the bicep is up to perception suite level on the robot) and to lower the robot arm (e.g., so that the bicep is just above the mobile base). This motion is beneficial to allow the robot to efficiently perform manipulation operations (e.g., top grasps and side grasps) at different target height levels in the environment. For instance, the shoulder pitch J1 joint may be rotated to a vertical up position to allow the robot to easily manipulate objects on a table in the environment. The shoulder pitch J1 joint may be rotated to a vertical down position to allow the robot to easily manipulate objects on a ground surface in the environment.

The bicep roll J2 joint allows the robot to rotate the bicep to move the elbow and forearm relative to the bicep. This motion may be particularly beneficial for facilitating a clear view of the EOAS by the robot's perception system in the perception housing. By rotating the bicep roll J2 joint, the robot may kick out the elbow and forearm to improve line of sight to an object held in a gripper of the robot.

Moving down the kinematic chain, alternating pitch and roll joints (a shoulder pitch J1 joint, a bicep roll J2 joint, an elbow pitch J3 joint, a forearm roll J4 joint, a wrist pitch J5 joint, and wrist roll J6 joint) are provided to improve the manipulability of the robotic arm. The axes of the wrist pitch J5 joint, the wrist roll J6 joint, and the forearm roll J4 joint are intersecting for reduced arm motion to reorient objects. The wrist roll J6 point is provided instead of two pitch joints in the wrist in order to improve object rotation.

In some examples, a robotic arm such as the one illustrated in FIG. 4 may be capable of operating in a teach mode. In particular, teach mode may be an operating mode of the robotic arm that allows a user to physically interact with and guide robotic arm towards carrying out and recording various movements. In a teaching mode, an external force is applied (e.g., by the user) to the robotic arm based on a teaching input that is intended to teach the robot regarding how to carry out a specific task. The robotic arm may thus obtain data regarding how to carry out the specific task based on instructions and guidance from the user. Such data may relate to a plurality of configurations of mechanical components, joint position data, velocity data, acceleration data, torque data, force data, and power data, among other possibilities.

During teach mode the user may grasp onto the EOAS or wrist in some examples or onto any part of robotic arm in other examples, and provide an external force by physically moving robotic arm. In particular, the user may guide the robotic arm towards grasping onto an object and then moving the object from a first location to a second location. As the user guides the robotic arm during teach mode, the robot may obtain and record data related to the movement such that the robotic arm may be configured to independently carry out the task at a future time during independent operation (e.g., when the robotic arm operates independently outside of teach mode). In some examples, external forces may also be applied by other entities in the physical workspace such as by other objects, machines, or robotic systems, among other possibilities.

Figure 5A:
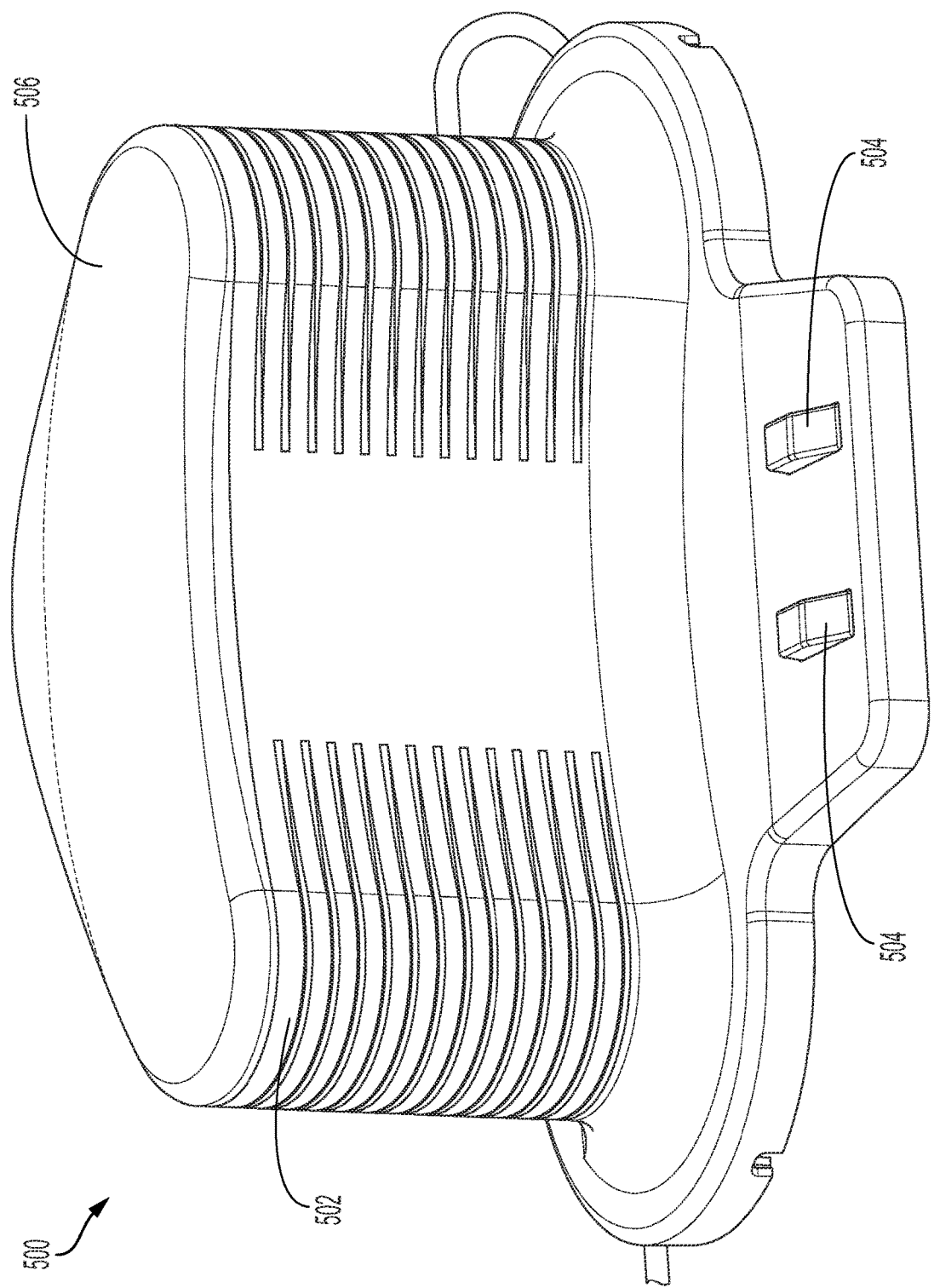

FIGS. 5A and 5B illustrate a docking station having a housing with an identification surface, in accordance with example embodiments. In particular, FIG. 5A shows a docking station 500 having a housing 502, a coupling component 504, and an identification surface 506. The housing 502 may enclose a computing device and circuitry configured to interface with a robot. For example, the docking station 500 may be a charging station for robots, and the housing 502 may enclose power electronics configured to provide electric power to the robot by way of the coupling component 504.

The coupling component 504 is depicted as including a positive and negative electric coupling configured for charging a robot. For example, corresponding electric couplings on the robot can interface with the coupling component 504 after the robot navigates to the docking station 500. In other examples, the coupling components could be mechanical couplings configured to hold the robot in place. For instance, the docking station may be a vehicle configured to move a plurality of robots within an environment.

In FIG. 5A, the identification surface 506 is depicted as being disposed on a top portion of the housing 502. However, within other examples, the identification surface can be on a front surface of the housing 502 (e.g., on the same surface as the coupling component 504) or another surface of the docking station 500. Further, the identification surface 506 has a visible portion facing the environment and that is detectable by robots and an undetectable (i.e., not visible from the environment) bottom portion facing the housing. In the present example, the identification surface is convex to the surrounding environment and concave to the housing 502. This allows the curvature of the identification surface to be readily detectable from multiple angles within the environment.

FIG. 5B shows an identification surface 506. In the present example, the identification surface 506 is symmetric across a plane 508. Within examples, plane 508 can be defined along a particular dimension of the identification surface 506. For example, FIG. 5B depicts a first dimension 514, a second dimension 516, and a third dimension 518, and plane 508 is defined along the first dimension 514. However, within other examples, the identification surface 506 might be amorphous (i.e., not symmetric across any plane). Further, as described further below, the identification surface 506 has a continuous curvature in three dimensions. However, in further examples the identification surface may only have a continuous curvature in one or two dimensions. Having a continuous curvature along three dimensions may allow for the docking station 500 to be detectable from 360 degrees surrounding the docking station 500, and also may allow for each portion of the identification surface to be identifiable, as described further below. Though particular rates of change in curvature are associated with the identification surface 506, other rates of change could be used in accordance with a different shape.

Though the present example shows an identification surface 506 on a docking station, other implementations of the identification surface 506 are possible. For example, the identification surface 506 can denote a location for stacking loads, a location of a waste receptacle, another robot, or other objects of interest to a robot. Different types of identification surfaces can denote different types of objects, as described further below.

Figure 6A:
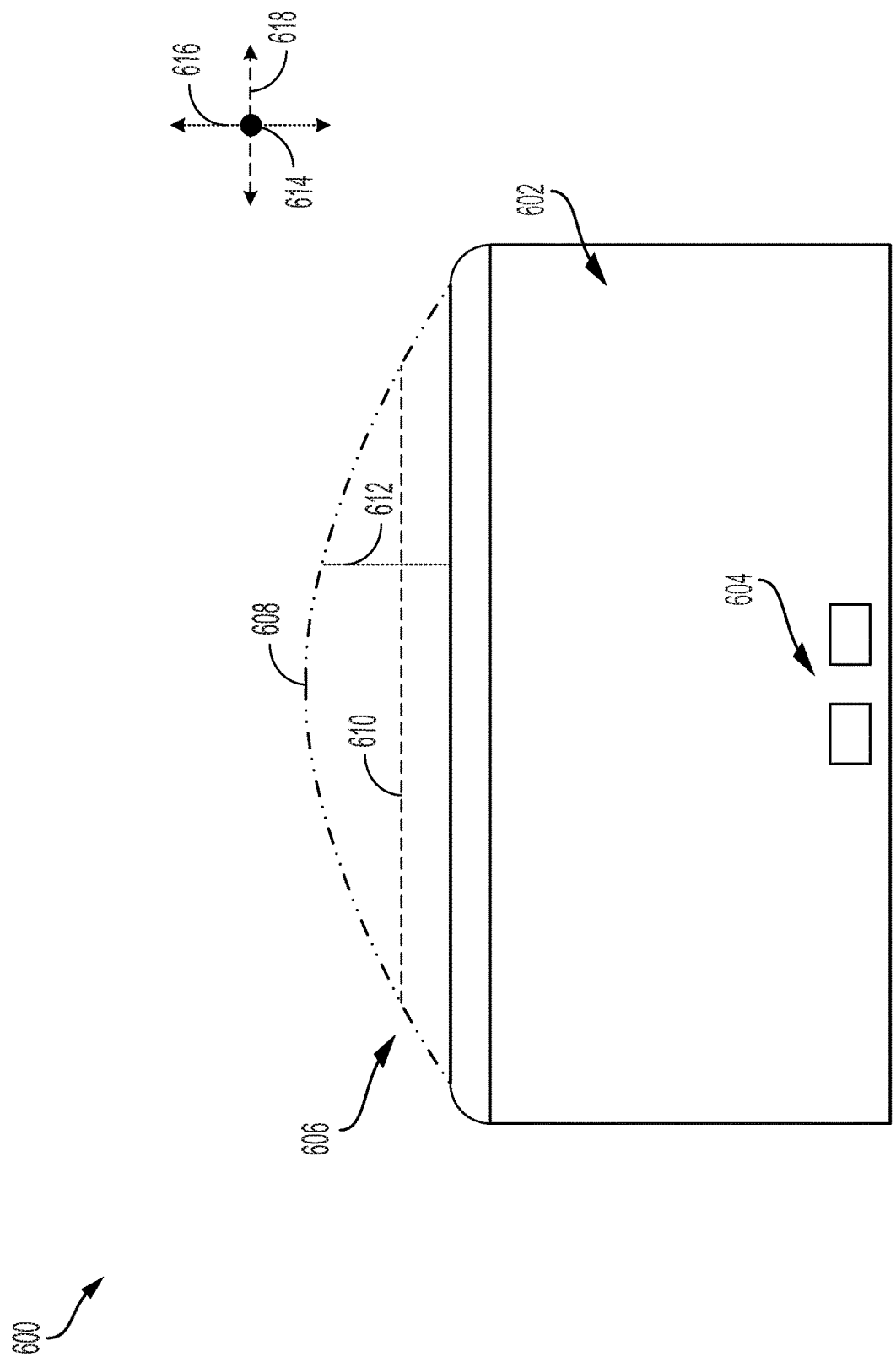

FIGS. 6A, 6B, 6C, 6D, and 6E illustrate an identification surface, in accordance with example embodiments. In particular, FIG. 6A shows a side view of a docking station 600 having a housing 602, a coupling component 604, and an identification surface 606. Many curvatures could be marked in the identification surface 606. For example, any surface line drawn along the identification surface can denote a curvature. In the present example, three such lines are drawn along three corresponding dimensions. In particular, a first curvature 608 is shown across a first dimension 614 on the identification surface 606, a second curvature 610 is shown across a second dimension 616 of the identification surface 606, and a third curvature 612 is shown across a third dimension 618 of the identification surface 606. The second dimension 616 is orthogonal to the first dimension 614 and the third dimension 618 is orthogonal to the first dimension 614 and the second dimension 616.

As shown in FIG. 6A, the coupling component 604 is disposed on the housing 602 along the third dimension 618 and the identification surface 606 is oriented in a parallel manner to the coupling component 604 along the third dimension 618. More particularly, the identification surface 606 is symmetrical across a plane that runs orthogonal to the coupling component 604. This arrangement may allow a robot to navigate to couple to the coupling component 604 more reliably.

Figure 6B:
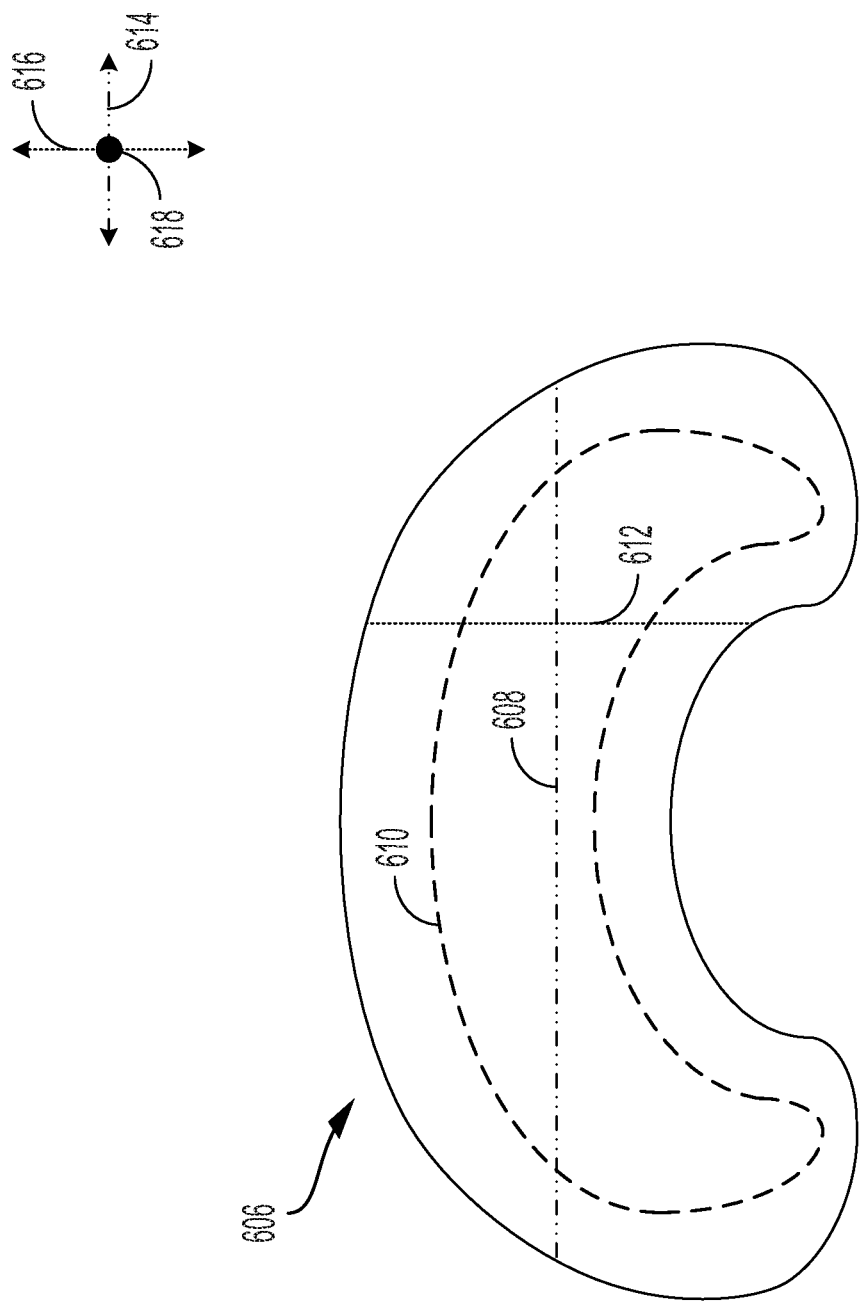

FIG. 6B shows a top view of the identification surface 606. More particularly, FIG. 6B shows how the first curvature 608, second curvature 610, and third curvature 612 are situated on the identification surface 606. The first dimension 614, second dimension 616, and third dimension 618 are depicted to show a relative change in perspective from FIG. 5A. Within examples, the identification surface 606 is configured such that any curvature is continuous (i.e., has a substantially constant rate of change in curvature along a given dimension). Thus, any curvature oriented above or below the first curvature 608 along the first dimension 614 would also be continuous, any curvature parallel to the second curvature 610 along the second dimension 616 would also be continuous, and any curvature oriented to the left or right of the third curvature 612 along the third dimension 618 would also be continuous.

FIG. 6C shows the first curvature 608. In particular, FIG. 6C shows a first curvature comb 620 drawn on the first curvature 608. A curvature comb includes a plurality of line segments drawn at a normal angle to a given point touching a curvature, and a length of each line segment depicts the curvature at that point. Thus, as line segments change in length along a curvature comb, this signifies a change in curvature. In the present example, the first curvature comb 620 has a change in length 622 between respective line segments that are substantially identical. This denotes a continuous surface. As described further below, detecting this quality of a curvature involves identifying curvatures at a plurality of points on a surface along a given dimension, and determining changes in curvature between those points.

Figure 6D:
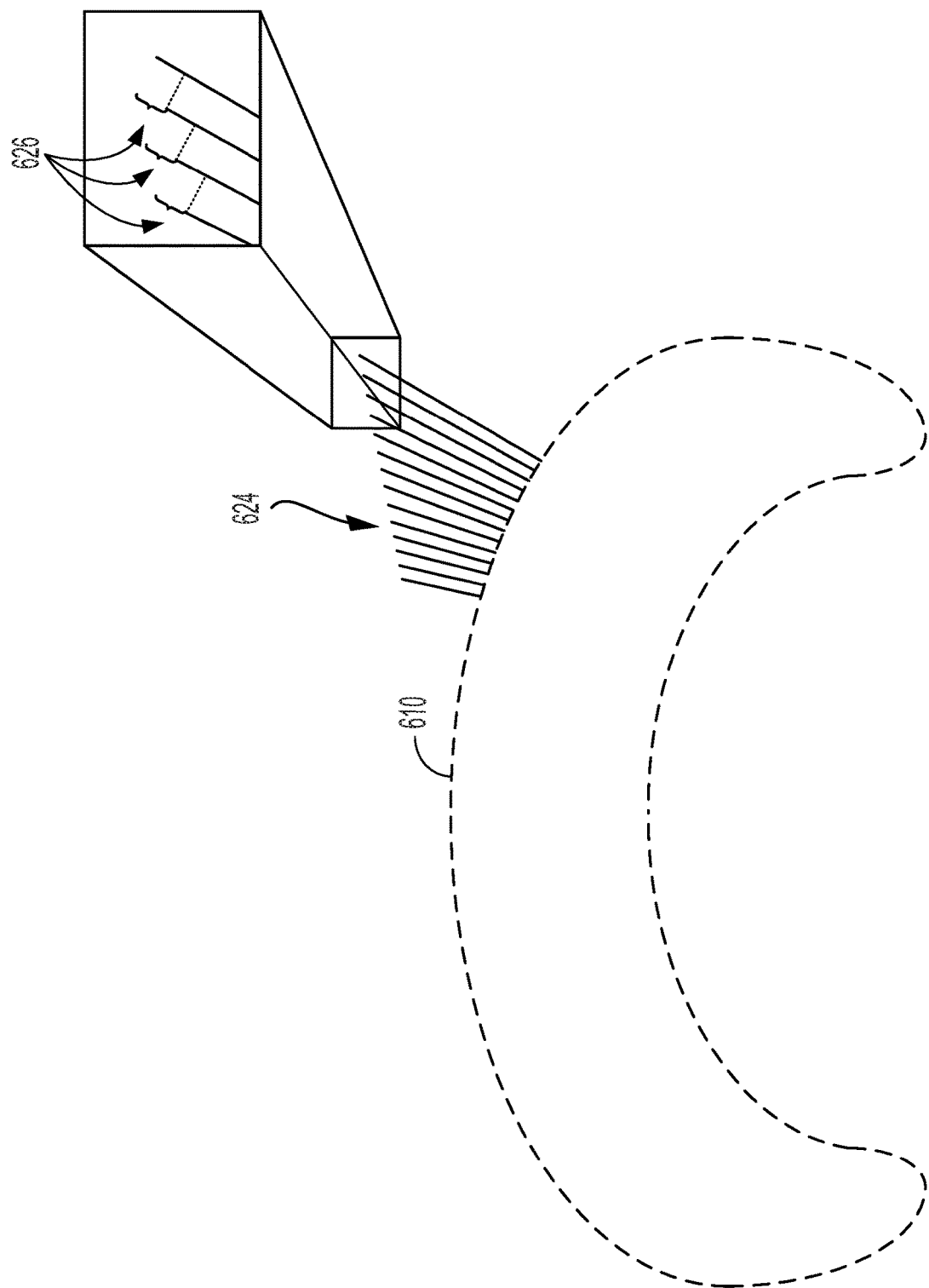

FIG. 6D shows the second curvature 610. As depicted in FIGS. 5A and 5B, the second curvature 610 is situated along a transverse dimension of the identification surface 606. Accordingly, whereas the first curvature 608 and the third curvature 612 are truncated by a bottom portion of the identification surface 606, the second curvature 610 forms a closed loop. Thus, the second curvature 610 is detectable from 360 degrees surrounding the identification surface 606.

The second curvature 610 is represented by a second curvature comb 624. As shown with respect to the first curvature 608, a change in length 626 between adjacent line segments in the second curvature comb 624 differ by substantially the same amount, indicating a continuous curvature. In some examples, such as that shown in FIG. 6D, a curvature can have one or more inflection points and still be considered continuous because the magnitude of change in curvature stays the same, even if signs thereof change. In other words, a curvature can be continuous so long as the absolute value of rate of change in curvature remains substantially the same. Still further, within examples, a portion of the curvature might be continuous while other portions are not.

Figure 6E:
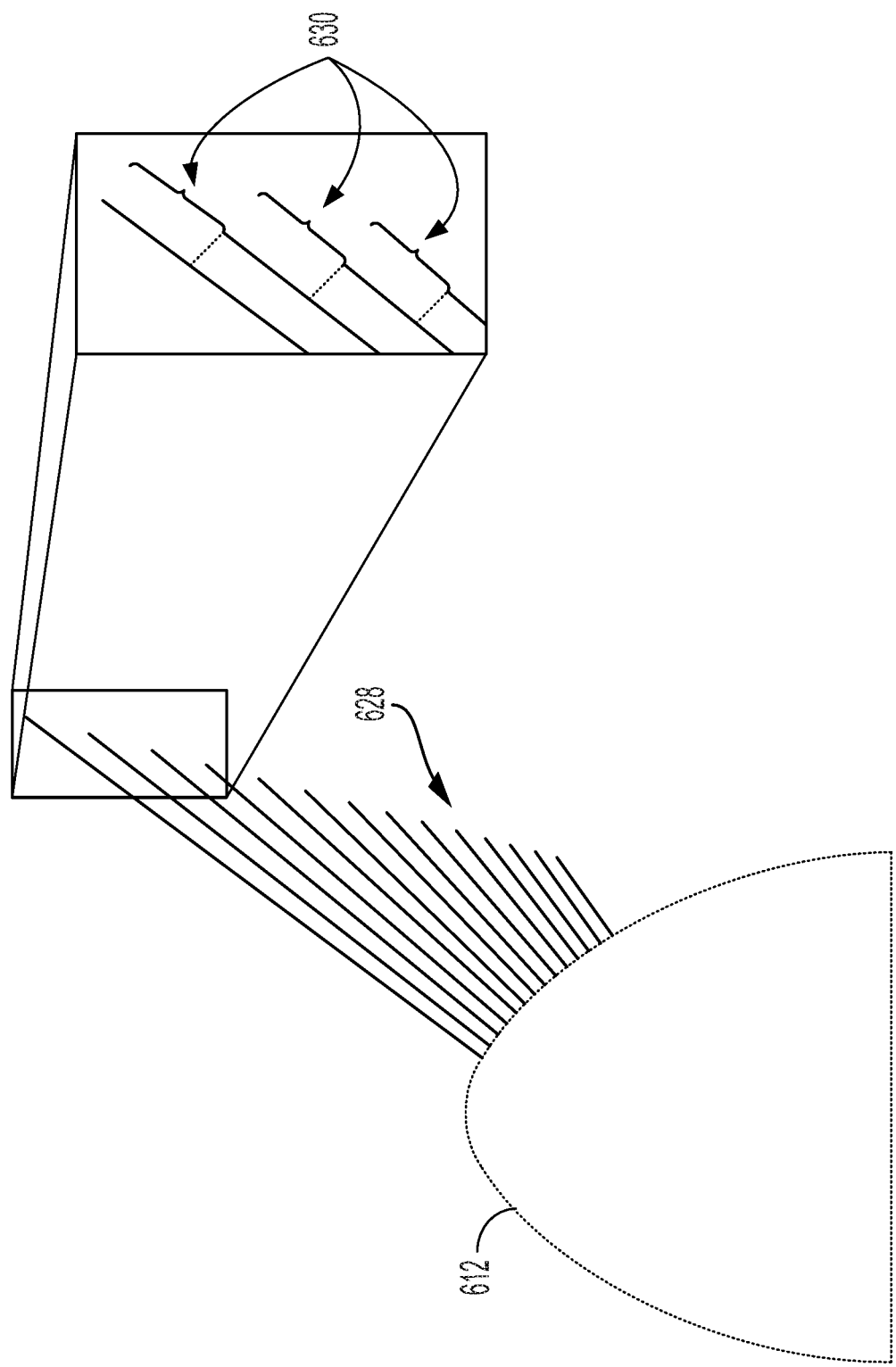

FIG. 6E shows the third curvature 612. As shown above with respect to the first curvature 608 and the second curvature 610, the third curvature 612 is represented with a third curvature comb 628. A change in length 630 between adjacent line segments in the third curvature comb 628 differ by substantially the same amount, indicating a continuous curvature.

Though FIGS. 6A, 6B, 6C, 6D, and 6E are representative of a particular configuration of curvatures that form an identification surface, different curvatures can be used to create the identification surface. Further, though the respective rates of change in curvature for the first curvature 608, second curvature 610, and third curvature 612 are depicted as being different, these rates in change in curvature may be the same or similar in other examples.

FIG. 7 illustrates a system including a robot and a docking station, in accordance with example embodiments. In particular, FIG. 8 depicts an environment in which a system 700 operates. The system 700 includes a robot 702 and a docking station having an identification surface 706. The docking station may be the same or similar to the docking station depicted in FIG. 5A. The following description of FIG. 8 relates to an example scenario for operating the system 700.

In the example scenario, the robot 702 navigates in the environment to perform tasks such as those described above with respect to FIGS. 1, 2, 3, and 4. The robot 702 may include an operating architecture that is the same or similar to that described in FIG. 1. The robot 702 may determine that one or more power sources (e.g., the power source(s) 114) are below a threshold charge level and responsively seek a docking station configured for charging the one or more power sources.

To identify the docking station, the robot 702 scans the environment, and uses resulting sensor data to localize itself within the environment. In the example scenario, the robot 702 determines its pose 712 within the environment. The pose 712 includes a position and an orientation of the robot 702. Based on the pose 712, the robot 702 determines a region of interest 704 in which to scan for the identification surface 706. For example, the region of interest 704 may be determined based on a map of the environment that includes locations of docking stations. The robot 702 may compare the pose 712 to the map of docking stations and determine that a docking station is located in a direction corresponding to the region of interest 704. Within other examples, the robot 702 may input data (e.g., one or more images of the environment) into a trained machine learning model and receive an indication of a docking station in the environment.

Turning back to the example scenario, the robot 702 scans the region of interest 704 for a docking station. For example, the robot 702 may obtain a plurality of images with fields of view corresponding to the region of interest 704 or obtain lidar scan data corresponding to the region of interest 704. The robot 702 can use one or more sensors of a perception housing (e.g., the perception housing 214) to obtain images using a stereo camera, or use a lidar sensor to obtain point cloud data. The robot 702 determines a depth map of the region of interest based on sensor data from the scan. Using the depth map, the robot 702 can identify a surface in the environment. In this case, the surface is the identification surface 706, though the robot 702 may detect other surfaces as well. As depicted in FIG. 7, within examples, the identification surface may be disposed below a height of the perception housing to facilitate the robot 702 detecting the identification surface 706 from multiple poses within the environment.

The robot 702 compares the surface (e.g., a portion of the depth map corresponding to a portion 708 of the identification surface 706) to a representation of a known identification surface. For example, the robot 702 may store the representation in a data storage (e.g., data storage 104), and compare the surface identified from the depth map to the representation. The known identification surface may correspond to a past scan of a region known to include an identification surface, or a computer-generated version of an identification surface. The representation of the known identification surface may include a 3D function, a meshgrid data structure, a plurality of example points from the known identification structure, or another representation. Further details of comparing the portion of the depth map to the representation of the known identification surface are provided below with respect to FIG. 9.

In the example scenario, based on comparing the identified surface to the known identification surface, the robot 702 determines that the identified surface (i.e., the identification surface 706) matches the representation. For example, this can involve aligning a portion of the depth map (e.g., a portion corresponding to the portion 708 of the identification surface 706) with a corresponding portion of the representation, and determining that the aligned portion of the depth map and the corresponding portion of the representation fall within a threshold tolerance level. For example, the threshold tolerance level may be a threshold standard deviation (e.g., 1% or 5% or 10%) of normalized distances between corresponding points of the aligned portions. Other ways of determining a match are possible.

Because the identification surface 706 has continuous curvatures in three dimensions, any given portion of the identification surface 706 has a unique combination of curvatures, and thus any portion of the identification surface 706 can be used to align with the representation of the known identification surface. This allows the robot 702 to identify the identification surface 706 even if most of the surface is obstructed or subject to poor visibility conditions.

Further, because the identification surface 706 has continuous curvatures in three dimensions, the robot 702 can determine its pose relative to the identification surface 706 by determining which portion of the identification surface 706 is visible from the pose 712. Thus, the robot 702 identifies the identification surface 706 as corresponding to a docking station, and uses the identification surface 706 to navigate. For example, as the robot 702 approaches the docking station, the robot 702 continues to scan the region of interest and determines which portion of the identification surface 706 is visible from its current pose. The robot 702 can adjust its path 716 while navigating accordingly to align with the coupling component 710 on the docking station.

In the example scenario, the docking station further includes a visual indicator 714 (e.g., a QR code) on a housing of the docking station, which can further assist the robot 702 in navigating towards the docking station. The visual indicator 714 can also serve to corroborate the determination that the identified surface in the environment corresponds to the known identification surface. The robot 702 can use image data to identify the visual indicator 714, which may be identifiable at a distance 718. Thus, the robot 702 navigates using the identification surface 706 at a first position prior to reaching the distance 718, and navigates using the visual indicator 714 (perhaps in addition to using the identification surface 706) at a second position after reaching the distance 718.

Having navigated to the docking station using the identification surface 706, the robot 702 couples to the coupling component 710 and thereby receives a power signal for charging one or more power sources of the robot 702. Coupling to the coupling component 710 may involve secondary sensing or signalling that confirms that the robot 702 has docked to the docking station. For example, one or more Hall effect sensors on the robot 702 and/or on the docking station in conjunction with a set of coupling magnets can be used to confirm that the robot 702 is docked. In other examples, a voltage and/or current sensor on one or more of the robot 702 and the docking station can confirm flow of electricity from the coupling component to the one or more power sources of the robot 702. Other ways of confirming coupling are possible.

Thus, in the example scenario, the robot 702 detects a surface, determines that the surface is an identification surface, uses the identification surface to navigate to a docking station, and thereby couples to a coupling component of the docking station.

Figure 9:
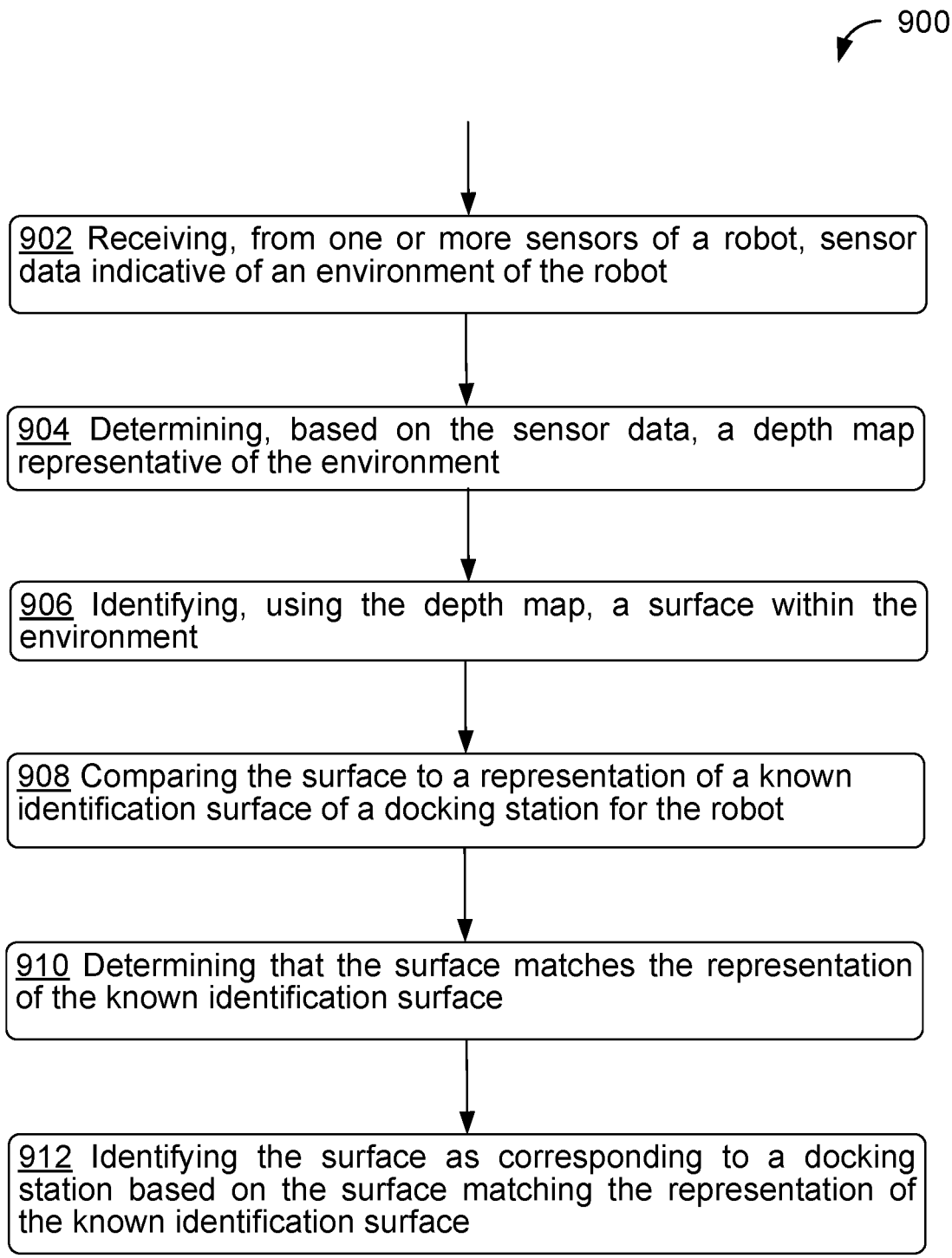
FIG. 9 illustrates a block diagram of a method, in accordance with example embodiments.

FIG. 8 illustrates a portion of an identification surface and a corresponding portion of a representation of a known identification surface, in accordance with example embodiments. In particular, FIG. 9 shows a portion 802 of a depth map used to identify a surface in an environment (e.g., the portion 708 of the identification surface 706) and a corresponding portion 808 of a representation of a known identification surface. For purposes of illustration, a first dimension 804 and a second dimension 806 are depicted as well.

To determine whether the portion 802 of the depth map matches the corresponding portion 808 the portion 802 undergoes a transformation 810 in which it is resized, rotated, translated, and thereby aligned with the corresponding portion 808 of the representation of the known identification surface. Performing the transformation may be based on determining one or more curvatures of the portion 802 of the depth map. In FIG. 9, these curvatures are denoted along the first dimension 804 and the second dimension 806. In other examples, additional curvatures (e.g., along a third dimension) can also be determined from the portion 802.

After aligning the portion 802 with the corresponding portion 808, respective points of the aligned portions can be compared. If the points fall within a threshold tolerance level (e.g., a standard deviation less than 1% or 5% or 10%), then the portions are determined as matching.

Within further examples, determining whether an identified surface in an environment matches a representation of a known identification surface can include determining whether the surface fits a 3D curvature function of the known identification surface, or matches a meshgrid data structure for the known identification surface. Other ways of determining that the identified surface corresponds to a docking station are possible.

FIG. 10 illustrates a block diagram of a method, in accordance with example embodiments. In some examples, method 900 of FIG. 10 may be carried out by a control system, such as control system 118 of robotic system 100. In further examples, method 900 may be carried by one or more processors, such as processor(s) 102, executing program instructions, such as program instructions 106, stored in a data storage, such as data storage 104. Execution of method 900 may involve any of the robots and/or robot components illustrated and described with respect to FIGS. 1-4. Other robotic devices may also be used in the performance of method 900. In further examples, some or all of the blocks of method 900 may be performed by a control system remote from the robotic device. In yet further examples, different blocks of method 900 may be performed by different control systems, located on and/or remote from a robotic device.

At block 902, method 900 includes receiving, from one or more sensors of a robot (e.g., the robot 702), sensor data indicative of an environment of the robot. For example, the robot can scan the environment using a stereo camera, a 3D lidar sensor, or another device used for obtaining data representative of the environment.

At block 904, method 900 includes determining, based on the sensor data, a depth map representative of the environment. The depth map can be formed from point cloud data from the lidar device, overlapping fields of view of a binocular camera system, or from other data. The depth map indicates relative positions of surfaces in the environment from the one or more sensors of the robot.

At block 906, method 900 includes identifying, using the depth map, a surface within the environment. For example, this surface may correspond to an identification surface (e.g., the identification surface 706). Identifying the surface may include selecting one surface of a plurality of surfaces in the environment. For example, the depth map may include a plurality of surfaces and the robot may select them sequentially. In other examples, identifying the surface may include testing one or more curvatures of the various surfaces. Identifying the surface may include identifying a surface having a curvature that is continuous (i.e., whose curvature varies at a substantially constant rate of change). This may be performed in accordance with the example scenario described above with respect to FIG. 7.

At block 908, method 900 includes comparing the surface to a representation of a known identification surface of a docking station for the robot. The representation of the known identification surface includes: a first curvature that varies at a first substantially constant rate of change along a first dimension, a second curvature that varies at a second substantially constant rate of change along a second dimension, and a third curvature that varies at a third substantially constant rate of change along a third dimension. The second dimension is orthogonal to the first dimension, and the third dimension is orthogonal to the first dimension and the second dimension. Within examples, comparing the surface to the representation of the known identification surface may include comparing respective curvatures of the surface and the representation of the known identification surface. In other examples, comparing the surface to the representation of the known identification surface may include aligning the surface to the representation of the known identification surface and comparing respective points on the surfaces to determine differences in respective points. As noted with respect to FIGS. 8 and 9, comparing the surface to the known identification surface may include comparing a portion of the depth map to the representation of the known identification surface. The representation of the known identification surface may include information indicative a 3D shape of an identification surface, such as that described above with respect to FIGS. 5A, 5B, 6A, 6B, 6C, 6D, and 6E.

Within examples, block 908 includes determining a local curvature of the surface along the first dimension, the second dimension, and the third dimension, and comparing the local curvature of the surface along the first dimension, the second dimension, and the third dimension to corresponding curvatures in the representation of the known identification surface. The local curvature may correspond to a portion of the depth map that represents the surface. This can be performed in accordance with FIG. 8 and the description thereof.

Within examples, determining the local curvature may involve transforming the portion of the depth map (e.g., by resizing, rotating, and/or translating the portion of the depth map) and determining the curvature of the transformed portion. Thus, within examples, block 908 includes determining a local curvature of the surface along the first dimension, the second dimension, and the third dimension, and transforming a portion of the depth map corresponding to the surface to align with the representation of the known identification surface based on the local curvature of the surface. This can be performed in accordance with FIG. 8 and the description thereof.

At block 910, method 900 includes determining that the surface matches the representation of the known identification surface. For example, this may include determining that differences between the surface and the representation of the known identification surface fall within an established tolerance level. For example, differences between corresponding points of the surface and the representation of the known identification surface can be compared to a threshold difference (e.g., a standard deviation less than 1% or 5% or 10%). This may be performed in accordance with FIGS. 7 and 8, and the description thereof.

At block 912, method 900 includes identifying the surface as corresponding to the docking station based on the surface matching the representation of the known identification surface. For example, the robot may determine that any surface that matches the representation of the known identification surface within an established tolerance level corresponds to an identification surface.

Within examples, method 900 further includes determining relative distances of a plurality of points of the transformed portion of the depth map to a corresponding plurality of points of the representation of the known identification surface. In these examples, determining that the surface matches the representation of the known identification surface comprises determining that the relative distances of the plurality of points of the transformed portion of the depth map to the corresponding plurality of points of the representation of the known identification surface are each less than a threshold distance (e.g., less than 0.01 units of the representation of the known identification surface).

Within examples, block 910 includes determining that a portion of the depth map corresponding to the surface matches a portion of the representation of the known identification surface. In these examples, the method 900 further includes determining a pose (e.g., the pose 712 of the robot 702) of the robot relative to the docking station based on which portion of the representation of the known identification surface matches the surface, and navigating toward the docking station based on the pose of the robot relative to the docking station. This can be performed in accordance with the example scenario described above with respect to FIG. 7.

Within examples in which the depth map is a first depth map representative of the environment at a first time, and the method 900 further includes determining, based on the sensor data, a second depth map representative of the environment at a second time (e.g., after the robot has started navigating towards the docking station). This can be performed similarly to block 904. The method 900 further includes identifying, using the second depth map, the surface within the environment at the second time. This can be performed similarly to block 906. The method 900 further includes determining that a portion of the second depth map corresponding to the surface at the second time matches a second portion of the representation of the known identification surface. This can be performed similarly to blocks 908 and 910. The method 900 further includes determining a second pose of the robot relative to the docking station based on which portion of the representation of the known identification surface matches the surface at the second time.

The method 900 further includes navigating toward the docking station based on the second pose of the robot relative to the docking station. Thus, the robot can use the identification surface to navigate towards the docking station.

Within examples, the method 900 further includes prior to identifying the surface, determining that a charge level of a battery of the robot has dropped below a threshold charge level, and responsive to determining that the charge level of the battery of the robot has dropped below the threshold charge level, determining a region of interest (e.g., the region of interest 704) within the environment associated with the docking station. The sensor data is representative of the region of interest within the environment. Within these examples, determining the region of interest can include determining a pose of the robot within the environment relative to a mapped position of the docking station within the environment, and determining the region of interest based on the pose of the robot within the environment relative to the mapped position of the docking station. In other examples, determining the region of interest includes applying a trained machine learning model to image data to determine an initial estimate of the location of the docking station. These examples can be performed in accordance with the example scenario described above with respect to FIG. 7.

Within examples where a machine learning model is used to determine an initial estimate of the location of the docking station, the method 900 further includes determining that the initial estimate of the location of the docking station is approximately correct. This can be performed, for example, by using additional information, such as information provided by a visual indicator (e.g., the visual indicator 714) to confirm the estimate of the location of the docking station. In other examples this involves determining that the surface matches the representation of the known identification surface. Within these examples, responsive to determining that the initial estimate of the location of the docking station is approximately correct, the method 900 includes providing an indication that the trained machine learning model successfully identified the region of interest.

In still further examples, the docking station may correspond to a docking station type (e.g., a charging docking station type). One or more of the first curvature, the second curvature, and the third curvature are indicative of the docking station type such that the docking station type is detectable based on one or more of the first curvature, the second curvature, and the third curvature. In such examples, the method 900 can further include determining a docking station type of the docking station based one or more curvatures of the surface. More generally, the identification surface can be used in this manner to identify a type of object, and thus can be used in contexts other than those associated with docking stations.

The operations described above with respect to FIG. 9 can be performed for identifying an identification surface within an environment and navigating thereto. Though such operations are described with respect to a docking station and a robot, it should be understood that this description is for exemplary purposes. Any type of object can be associated with an identification surface and any type of vehicle can be used to identify the identification surface and to navigate accordingly. Thus, depending on an operational context, the identification surfaces can be used in relation to automotive implementations, aerial implementations, industrial implementations, or any other navigational implementation within a 3D environment.

III. Conclusion

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software or hardware modules in the same physical device. However, other information transmissions may be between software modules or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A docking station comprising:
    at least one component configured to couple to a robot; and
    an identification surface comprising:
        a bottom portion;
        a first curvature that varies at a first substantially constant rate of change along a first dimension, wherein the first curvature is truncated by the bottom portion;
        a second curvature that comprises two inflection points at which a sign of curvature changes, wherein each portion of the second curvature between the two inflection points varies at a second substantially constant rate of change along a second dimension, wherein the second dimension is orthogonal to the first dimension; and
        a third curvature that varies at a third substantially constant rate of change along a third dimension, wherein the third dimension is orthogonal to the first dimension and the second dimension, and wherein the third curvature is truncated by the bottom portion.

2. The docking station of claim 1, further comprising a housing, wherein the identification surface is disposed on the housing.

3. The docking station of claim 2, wherein the identification surface is disposed on a top portion of the housing.

4. The docking station of claim 2, wherein the at least one component configured to couple to the robot comprises an electrical power output disposed on the housing.

5. The docking station of claim 2, further comprising a visual indicator disposed on the housing, wherein the identification surface is detectable by the robot at a first distance, and wherein the visual indicator is detectable at a second distance that is less than the first distance.

6. The docking station of claim 1, wherein the docking station corresponds to a docking station type, and wherein one or more of the first curvature, the second curvature, or the third curvature are indicative of the docking station type such that the docking station type is detectable based on one or more of the first curvature, the second curvature, and the third curvature.

7. The docking station of claim 2, wherein the identification surface comprises a visible top portion, wherein the bottom portion is hidden and disposed towards the housing, and wherein the identification surface is detectable from the top portion.

8. The docking station of claim 1, wherein the first substantially constant rate of change, the second substantially constant rate of change, and the third substantially constant rate of change are all different.

9. The docking station of claim 1, wherein the first dimension is longer than the second dimension and the third dimension, and wherein the at least one component configured to couple to the robot is centered relative to the first dimension.

10. A method comprising:
receiving, from one or more sensors of a robot, sensor data indicative of an environment of the robot;
determining, based on the sensor data, a depth map representative of the environment;
identifying, using the depth map, a surface within the environment;
comparing the surface to a representation of a known identification surface of a docking station for the robot, wherein the representation of the known identification surface comprises:
a bottom portion;
a first curvature that varies at a first substantially constant rate of change along a first dimension, wherein the first curvature is truncated by the bottom portion,
a second curvature that comprises two inflection points at which a sign of curvature changes, wherein each portion of the second curvature between the two inflection points varies at a second substantially constant rate of change along a second dimension, wherein the second dimension is orthogonal to the first dimension, and
a third curvature that varies at a third substantially constant rate of change along a third dimension, wherein the third dimension is orthogonal to the first dimension and the second dimension, and wherein the third curvature is truncated by the bottom portion;
determining that the surface matches the representation of the known identification surface; and
identifying the surface as corresponding to the docking station based on the surface matching the representation of the known identification surface.

11. The method of claim 10, wherein comparing the surface to the representation of the known identification surface comprises:
determining a local curvature of the surface along the first dimension, the second dimension, and the third dimension; and
comparing the local curvature of the surface along the first dimension, the second dimension, and the third dimension to corresponding curvatures in the representation of the known identification surface.

12. The method of claim 10, wherein comparing the surface to the representation of the known identification surface comprises:
determining a local curvature of the surface along the first dimension, the second dimension, and the third dimension; and
transforming a portion of the depth map corresponding to the surface to align with the representation of the known identification surface based on the local curvature of the surface.

13. The method of claim 12, further comprising determining relative distances of a plurality of points of the transformed portion of the depth map to a corresponding plurality of points of the representation of the known identification surface, wherein determining that the surface matches the representation of the known identification surface comprises determining that the relative distances of the plurality of points of the transformed portion of the depth map to the corresponding plurality of points of the representation of the known identification surface are each less than a threshold distance.

14. The method of claim 10, wherein determining that the surface matches the representation of the known identification surface comprises determining that a portion of the depth map corresponding to the surface matches a portion of the representation of the known identification surface, the method further comprising:
determining a pose of the robot relative to the docking station based on which portion of the representation of the known identification surface matches the surface; and
navigating toward the docking station based on the pose of the robot relative to the docking station.

15. The method of claim 14, wherein the depth map is a first depth map representative of the environment at a first time, the method further comprising:
determining, based on the sensor data, a second depth map representative of the environment at a second time;
identifying, using the second depth map, the surface within the environment at the second time;
determining that a portion of the second depth map corresponding to the surface at the second time matches a second portion of the representation of the known identification surface;
determining a second pose of the robot relative to the docking station based on which portion of the representation of the known identification surface matches the surface at the second time; and
navigating toward the docking station based on the second pose of the robot relative to the docking station.

16. The method of claim 10, further comprising:
prior to identifying the surface, determining that a charge level of a battery of the robot has dropped below a threshold charge level; and
responsive to determining that the charge level of the battery of the robot has dropped below the threshold charge level, determining a region of interest within the environment associated with the docking station, wherein the sensor data is representative of the region of interest within the environment.

17. The method of claim 16, wherein determining the region of interest comprises:
determining a pose of the robot within the environment relative to a mapped position of the docking station within the environment; and
determining the region of interest based on the pose of the robot within the environment relative to the mapped position of the docking station.

18. The method of claim 16, wherein determining the region of interest comprises:
applying a trained machine learning model to image data to determine an initial estimate of the location of the docking station.

19. The method of claim 18, further comprising:
determining that the initial estimate of the location of the docking station is approximately correct; and
responsive to determining that the initial estimate of the location of the docking station is approximately correct, providing an indication that the trained machine learning model successfully identified the region of interest.

20. A system comprising:
a docking station comprising:
  a housing;
  a coupling component; and
  an identification surface disposed on the housing, wherein the identification surface comprises:
    a bottom portion;
    a first curvature that varies at a first substantially constant rate of change along a first dimension, wherein the first curvature is truncated by the bottom portion,
    a second curvature that comprises two inflection points at which a sign of curvature changes, wherein each portion of the second curvature between the two inflection points varies at a second substantially constant rate of change along a second dimension, wherein the second dimension is orthogonal to the first dimension, and
    a third curvature that varies at a third substantially constant rate of change along a third dimension, wherein the third dimension is orthogonal to the first dimension and the second dimension, and wherein the third curvature is truncated by the bottom portion; and
a robot configured to perform a set of functions comprising:
  detecting the identification surface;
  navigating toward the docking station based on detecting the identification surface; and
  coupling to the coupling component of the docking station.

21. The system of claim 20, the set of functions further comprising:
  receiving a representation of mapped positions of docking stations from a database of known positions of docking stations within the environment;
  determining a pose of the robot within the environment relative to a mapped position of the docking station within the environment; and
  determining a region of interest within the environment based on the pose of the robot within the environment relative to the mapped position of the docking station.

22. The system of claim 20, further comprising a database of docking station types, the set of functions further comprising:
  receiving a representation of the docking station types from the database;
  determining one or more of the first curvature, the second curvature, or the third curvature of the identification surface;
  determining a docking station type corresponding to the docking station based on (i) one or more of the first curvature, the second curvature, or the third curvature of the identification surface and (ii) one or more curvatures associated with the docking station type; and
  determining whether to navigate toward the docking station based on the docking station type.

23. The system of claim 20, wherein the docking station further comprises a visual indicator disposed on the housing, the set of functions further comprising:
  navigating the robot based on the identification surface until reaching a distance at which the robot detects the visual indicator; and
  navigating the robot based at least in part on the visual indicator after detecting the visual indicator.

* * * * *